United States Patent
Breslau

(10) Patent No.: US 10,902,012 B1
(45) Date of Patent: Jan. 26, 2021

(54) METHODS AND SYSTEMS FOR USING DATATYPES TO REPRESENT COMMON PROPERTIES

(71) Applicant: The MathWorks, Inc., Natick, MA (US)

(72) Inventor: Jason D. Breslau, Holliston, MA (US)

(73) Assignee: The MathWorks, Inc., Natick, MA (US)

(*) Notice: Subject to any disclaimer, the term of this patent is extended or adjusted under 35 U.S.C. 154(b) by 239 days.

(21) Appl. No.: 15/801,277

(22) Filed: Nov. 1, 2017

(51) Int. Cl.
 *G06F 16/25* (2019.01)
 *G06F 16/28* (2019.01)
 *G06F 3/0484* (2013.01)
 *G06F 9/451* (2018.01)
 *G06F 16/84* (2019.01)
 *G06F 16/22* (2019.01)

(52) U.S. Cl.
 CPC .......... *G06F 16/258* (2019.01); *G06F 3/0484* (2013.01); *G06F 9/451* (2018.02); *G06F 16/2219* (2019.01); *G06F 16/289* (2019.01); *G06F 16/86* (2019.01); *G06F 16/88* (2019.01)

(58) Field of Classification Search
 CPC ...... G06F 16/258; G06F 9/451; G06F 3/0484; G06F 16/84; G06F 16/289
 USPC .................................................. 707/602, 756
 See application file for complete search history.

(56) References Cited

U.S. PATENT DOCUMENTS

| | | | | |
|---|---|---|---|---|
| 5,974,407 A * | 10/1999 | Sacks | .................... | G06F 16/284 707/999.002 |
| 7,353,506 B2 * | 4/2008 | Bley | .................... | G06F 11/3624 714/E11.207 |
| 8,005,707 B1 * | 8/2011 | Jackson | .................... | G06F 17/18 705/7.29 |
| 8,255,890 B2 * | 8/2012 | Luszczek | .............. | G06F 9/5027 717/149 |
| 8,418,160 B2 * | 4/2013 | Doyle | .................... | G06F 8/4441 717/159 |
| 2005/0091638 A1 * | 4/2005 | Bley | .................... | G06F 11/3624 717/111 |

(Continued)

OTHER PUBLICATIONS

Wikipedia, C date and time functions, retrieve by web.archive. org:https://web.archive.org/web/20160407074831/https://en.wikipedia.org/wiki/C_date_and_time_functions, publication Apr. 7, 2016, 4 pages.*

*Primary Examiner* — Phong H Nguyen
(74) *Attorney, Agent, or Firm* — Finnegan, Henderson, Farabow, Garrett & Dunner, LLP

(57) ABSTRACT

Methods and systems for using common property datatypes are described. In some embodiments, a system may receive an assignment statement a data structure comprising a first object of a first datatype, the first datatype one of multiple datatypes supporting a common property, the multiple datatypes representing the common property using differing native values, and a common property object of a common property datatype, the common property object representing the common property supported by the multiple datatype. The system can execute or interpret the subscripted assignment statement, converting the common property object into a second object of the first datatype, the second object having a first native value representing the common property for the first datatype. The system can assign the second object to a location of the first object in the data structure. The common property can be at least one of a maximum, minimum, missing, and default.

17 Claims, 17 Drawing Sheets

(56) References Cited

U.S. PATENT DOCUMENTS

| | | | |
|---|---|---|---|
| 2009/0044179 A1* | 2/2009 | Luszczek | G06F 8/314 |
| | | | 717/149 |
| 2012/0096448 A1* | 4/2012 | Doyle | G06F 8/4441 |
| | | | 717/159 |
| 2012/0284726 A1* | 11/2012 | Luszczek | G06F 8/314 |
| | | | 718/102 |
| 2013/0325904 A1* | 12/2013 | Clifford | G06F 8/437 |
| | | | 707/801 |
| 2016/0140204 A1* | 5/2016 | Brown | G06Q 30/0202 |
| | | | 707/602 |

* cited by examiner

| Datatype | Uint8 | Double | Datetime | Categorical | String | Graphical |
|---|---|---|---|---|---|---|
| Missing | | | | | | |
| Native Value | | Not-a-Number | Not-a-Time | Undefined | Missing | Missing |
| Representation | | Exponent: $e_{max}$ - 1<br>Significand: Non-Zero<br>Sign: Any | Exponent: $e_{max}$ - 1<br>Significand: Non-Zero<br>Sign: Any | 0 | Null Pointer | Placeholder |
| Maximum | | | | | | |
| Native Value | 255 | +Inf | | User Defined | | |
| Representation | 255 | Exponent: $e_{max}$ - 1<br>Significand: Zero<br>Sign: Positive | | Number<br>of Categories | | |
| Minimum | | | | | | |
| Native Value | 0 | -Inf | | User Defined | | |
| Representation | 0 | Exponent: $e_{max}$ - 1<br>Significand: Zero<br>Sign: Negative | | 1 | | |

FIG. 1

| Index | A double | B datetime | C string | D categorical | E char | F graphics |
|---|---|---|---|---|---|---|
| 1 | NaN | d1 | 'one' | 'red' | 'A' | h1 |
| 2 | 3 | NaT | 'three' | 'yellow' | 'C' | h2 |
| 3 | 5 | d2 | '' | 'blue' | 'E' | h3 |
| 4 | 7 | d3 | 'seven' | '' | 'G' | h4 |
| 5 | 9 | d4 | 'nine' | 'violet' | '' | h5 |
| 6 | 11 | d5 | 'eleven' | 'ultraviolet' | 'K' | h6 |
| 7 | 13 | d6 | 'thirteen' | 'orange' | 'M' | NaH |

910

| Index | A double | B datetime | C string | D categorical | E char | F graphics |
|---|---|---|---|---|---|---|
| 1 | MISSING | d1 | 'one' | 'red' | 'A' | h1 |
| 2 | 3 | MISSING | 'three' | 'yellow' | 'C' | h2 |
| 3 | 5 | d2 | MISSING | 'blue' | 'E' | h3 |
| 4 | 7 | d3 | 'seven' | MISSING | 'G' | h4 |
| 5 | 9 | d4 | 'nine' | 'violet' | MISSING | h5 |
| 6 | 11 | d5 | 'eleven' | 'ultraviolet' | 'K' | h6 |
| 7 | 13 | d6 | 'thirteen' | 'orange' | 'M' | MISSING |

| Index | A | B | C | D |
| --- | --- | --- | --- | --- |
| | double | datetime | char | int8 |
| 1 | 1.7977e+308 | 2014-05-26T13:30-05:00 | 'A' | 2 |
| 2 | 3 | 9999-12-31T23:59Z | 'C' | 4 |
| 3 | 5 | 2014-08-26T13:30-04:00 | 'E' | 6 |
| 4 | 7 | 2014-09-26T13:30Z | 'G' | 8 |
| 5 | 9 | 2017-02-08 | N.A.C. | 10 |
| 6 | 11 | 2010-01-08 | 'K' | 127 |

FIG. 10

METHODS AND SYSTEMS FOR USING DATATYPES TO REPRESENT COMMON PROPERTIES

BRIEF DESCRIPTION OF THE DRAWINGS

The drawings are not necessarily to scale or exhaustive. Instead, emphasis is generally placed upon illustrating the principles of the embodiments described herein. The accompanying drawings, which are incorporated in and constitute a part of this specification, illustrate several embodiments consistent with the disclosure and, together with the description, serve to explain the principles of the disclosure. In the drawings:

FIG. 1 depicts, for multiple datatypes, native values and representations for multiple common properties.

FIGS. 9A to 9D depict further exemplary applications of a MINIMUM datatype.

FIG. 10 depicts an exemplary application of a MAXIMUM datatype.

DETAILED DESCRIPTION

Figure 2:
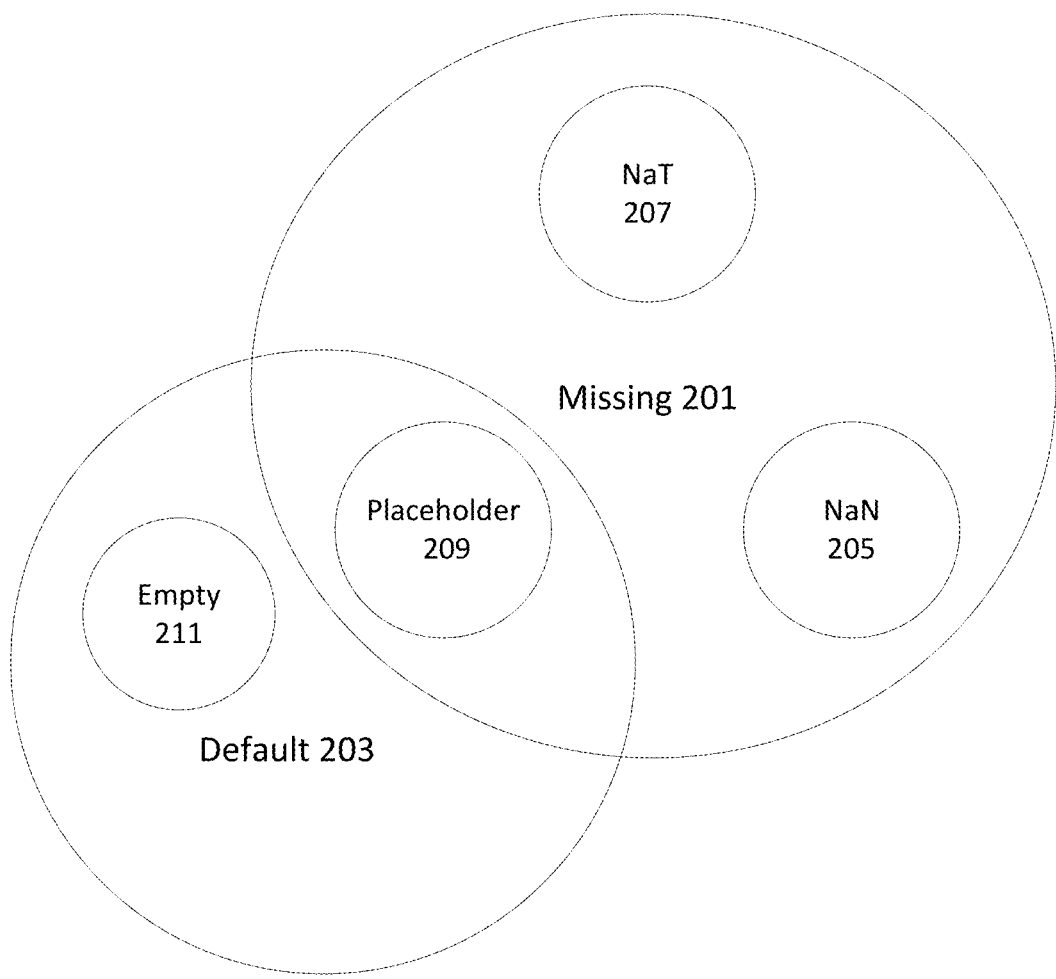
FIG. 2 depicts the association of multiple common properties with a single native value.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

This detailed description addresses the benefits of common property datatypes, implementation considerations, exemplary computing environments for realizing the envisioned embodiments, and specific usage examples.

As detailed herein, a computing environment can improve usability, reduce code complexity, enhance extensibility and code reuse, and enhance forward and backward compatibility of programs by using datatypes that represent common properties. Datatypes representing common properties can improve usability by insulating users from the differing native values different datatypes use to represent a common property. For example, a user can write a program using common property objects without having to know these differing native values. Replacing a multitude of native values with a single datatype can make programming simpler and easier for users, particular new or inexperienced users.

Datatypes that represent common properties can reduce program complexity because a single operation can be used for multiple different datatypes. In contrast, using flow control statements to expressly address different datatypes increases program complexity. This additional complexity can lead to inefficiency and errors, and can obscure the overall purpose and logical structure of the program.

Datatypes that represent common properties can enhance extensibility and code reuse by allowing programs to be used with different, new, or user-defined datatypes. A program using a common property datatype to represent a common property can process different datatypes without a-priori knowledge of these datatypes (so long as they support the common property datatype). In contrast, a program using flow control statements to expressly address different datatypes may require revisions to process different, new, or user-defined datatypes.

Datatypes that represent common properties can enhance forward and backward compatibility of programs. Such datatypes can enhance forward compatibility by insulating a program from changes to the computing environment, so long as the computing environment continues to support the datatypes representing common properties. Furthermore, datatypes that represent common properties can improve backwards compatibility, since new operations, features, and datatypes can be configured to support the datatypes representing common properties, even if they implement other changes to the computing environment.

Implementation of the envisioned embodiments can be described with regard to the following considerations: computing environment, datatypes, common properties, common property datatypes, precedence hierarchies, operations, and implicit conversion. These aspects are described in detail below with regard to FIGS. 1, 2, 3A, 3B, 4A and 4B.

In some implementations, a computing environment can be software, hardware, or a combination of hardware and software that enables users to perform tasks related to disciplines including, but not limited to, mathematics, science, engineering, medicine, business, etc., without requiring users to develop code in a conventional programming language, such as C++, C, Fortran, Pascal, etc. A computing environment can be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

A computing environment can support a programming language (e.g., the M language, a MATLAB® language, a MATLAB-compatible language, a MATLAB-like language, etc.) that is capable of expressing problems and/or solutions in mathematical notation. This programming language can support array-based programming, in which operations may apply to entire sets of values included in arrays. This array-based programming can enable specification of array-based operations without explicitly specifying loops of individual non-array operations. This programming language can be dynamically typed. For example, in a dynamically typed array-based computing language, data can be contained in arrays and data types of the data may be determined (e.g., assigned) at program execution time.

The following example illustrates execution by a computing environment of an exemplary program written in a dynamically typed array-based computing language. The program includes the following statements:

A='hello'
A=int32([1, 2])
A=[1.1, 2.2, 3.3]

During run-time, when the statement "A='hello'" is executed, variable "A" may be a string object. Later, when the statement "A=int32([1, 2])" is executed, since the language may be dynamically typed, the datatype of variable "A" may be a 1-by-2 array containing 32 bit integer objects. Later, when the statement "A=[1.1, 2.2, 3.3]" is executed, the datatype of variable "A" may be changed from the 1-by-2 array to a 1-by-3 array containing double objects. Thus, data in a program written in a dynamically typed array-based computing language may be contained in an array. Moreover, the datatype of the data may be determined during execution of the program. Thus, in a dynamically typed array-based computing language, data may be represented by arrays and datatypes may be determined at runtime.

In some embodiments, the computing environment can provide matrix and/or vector operations for data analysis, data visualization, application development, simulation, modeling, and/or algorithm development. These matrix and/or vector operations can be broadly applicable to many different fields. As a non-limiting example, such operations can be used in the technical fields of statistics, image processing, signal processing, control design, life sciences modeling, discrete event analysis and/or design, or state-based analysis and/or design. Additionally or alternatively, the computing environment can provide graphical tools for generating plots, surfaces, images, volumetric representations, or other representations.

In some embodiments, the computing environment is extensible. For example, the computing environment can provide core functionality extensible through additional toolboxes (e.g., toolboxes for signal processing, image processing, data plotting, parallel processing, etc.) that integrate with the core functionality. As an additional example, the computing environment can extend the core functionality using function libraries, local data structures, remote data structures (e.g., a database operating in a computing cloud), remote procedure calls (RPC), and/or application programming interfaces (API). Additionally or alternatively, the computing environment can be configured to improve run-time performance when performing computing operations. For example, the computing environment can include a just-in-time (JIT) compiler.

In some embodiments, the computing environment can generate code from a model, such as a graphical model. For example, the computing environment can transform code from a graphical format into a second, non-graphical format. As an additional example, the computing environment can generate source code, assembly language code, binary code, interface information, configuration information, performance information, etc., from at least a portion of the graphical model. For example, the computing environment can generate C, C++, SystemC, Java, etc., from the graphical model. Additionally, or alternatively, the computing environment can further generate Unified Modeling Language (UML) based representations and/or extensions from some or all of a graphical model (e.g., System Modeling Language (SysML), Extensible Markup Language (XML), Modeling and Analysis of Real Time and Embedded Systems (MARTE), Hardware Description Language (HDL), Automotive Open System Architecture (AUTOSAR), etc.).

In some implementations, a datatype can be a particular representation of data in a computing system. A datatype can specify the amount of storage allocated to an instance of the datatype (referred to as an "object"), the encoding of the object as a pattern of binary digits in a storage medium, the semantic meaning of the object, that an object of the datatype can take one or more values and the ranges these values may take (or that the object takes no value), or operations that can be performed on the object. For example, the datatype "double" can specify that a double object is a double-precision floating point number constructed according to IEEE Standard for Floating-Point Arithmetic (IEEE 754-2008)(incorporated herein by reference in its entirety) for double-precision floating-point numbers. The datatype double can specify how to create a double object. For example, the datatype can specify one or more constructors that allocate storage and assign a default value for a double object. The datatype double can specify arithmetic, relational, logical, set, and/or bit-wise operations that can be performed on a double object. These operations can take one or more arguments, which can include double objects or other objects of other datatypes. For example, the datatype double can specify a method for adding two double objects. As an additional example, the datatype double can specify a method for adding a uint8 object (an unsigned integer taking a value between 0 and 255) to a double object. The datatype double can specify how to convert other objects of other datatypes into double objects. For example, the datatype double can specify how to convert an int32 object (a unsigned integer taking a value between $-2^{31}$ to $2^{31}-1$) to a double object. The datatype double can specify how to create new double objects. For example, the datatype double can specify one or more constructors that create double objects. These constructors can take other objects as arguments and can create double objects initialized to different values. Datatypes can be specified in terms of other datatypes. For example, the datatype "string" can be defined as a "pointer" to an array of "characters." In this manner, a string object can be defined in terms of the "pointer" and "character" datatypes.

An object can have a value. As non-limiting examples, a unint8 object can have the value "132," a double object can have the value "2.71828," a logical object can have the value "True," and a string object can have the value "Lorem ipsum dolor sit amet." An object with multiple fields can have the value of the fields. As a non-limiting example, when object A has fields A.a and A.b, then an exemplary value of A can be A.a="start", A.b=3.14159. Objects of different datatypes can have the same value. For example, both a uint8 object and a double object can have the value "16."

A representation of an object can be the physical representation of the value for the object stored by the computing environment. In some implementations, a representation of an object can be one or more binary numbers stored by the computing environment (e.g., a bit pattern stored in a non-transitory computer readable medium). For example, the computing environment can be configured to represent a unint8 object with the value "2" as the binary number "00000010". The computing environment can be configured to store this binary number "00000010" in a computer-readable medium as the physical representation of the value for the unint8 object.

Different datatypes can differently represent the same value. For example, a unint8 object and a double object can represent the value "16" with different binary numbers. These binary numbers can differ in length (e.g., the unint8 object can represent values with an 8-bit binary number while the double object can represent values with a 64-bit binary number) and in format (e.g., the unint8 object can represent "16" with a single binary number, while the double object can represent "16" with three binary numbers: a sign bit, a significand, and an exponent).

Performing operations using objects of different types can require converting between differing representations of a value. As a non-limiting example, consider assigning a value of a first object of a first datatype to a second object of a second datatype. Copying the bit-pattern of the first object to the location of the second object may not correctly assign the value of the first object to the second object, because the first and second datatypes may represent the same value differently. Instead, the computing environment must set the bit-pattern of the second object to correctly represent the value for the second datatype.

A property can be a concept relevant to a particular computing environment, such as a particular programming language, computing environment, program or application (or particular session or execution of a program or application), or set of instructions. Non-limiting examples of "properties" can include "missing value" (or "missing"), "greatest possible value" (or "maximum"), "least possible value" (or "minimum"), "error indication" (or "error"), and "default value" (or "default"). A property can be associated with a value for a datatype in a particular computing environment. For example, the MATLAB computing environment can associate the property "missing" with the value "NaN" for the datatype "double." Thus the value "NaN" represents the concept of a missing value for the datatype "double" in the MATLAB computing environment. As an additional example, the MATLAB computing environment can associate the property "maximum" with the value "255" for the datatype "uint8". Thus the value "255" represents the concept of a greatest possible value for the datatype "uint8" in the MATLAB computing environment. As a further example, the MATLAB computing environment can associate the property "minimum" with the value "−inf" for the datatype "double". Thus the value "−inf" represents the concept of a least possible value for the datatype "double" in the MATLAB computing environment.

In some implementations, a common property can be a property associated with values for multiple datatypes in a particular computing environment. This property can be "common" because each of the multiple datatypes can have values that represent this property in the particular computing environment. In various implementations, native values can be the values representing the "common property" for that datatype. As would be appreciated by one of ordinary skill in the art, the representations of these "native values" can differ between the multiple datatypes. In some embodiments, at least one of the multiple datatypes differs in the native value representing the common property. In these embodiments, at least two of the multiple datatypes can share a native value representing the common property. In various embodiments, the native values for the multiple datatypes are distinct. In such embodiments, none of the multiple datatypes share a native value representing the common property.

FIG. 1 depicts, for multiple datatypes, native values and representations for multiple common properties, consistent with disclosed embodiments. In this non-limiting example, the common properties are "missing," "maximum," and "minimum," while the datatypes are "uint8," "double," "datetime," "categorical," "string," and "graphics object." A native value and representation of the native value is depicted for each common property and each datatype supporting that common property. A particular datatype may not support a particular common property, as indicated by the absence of a native value and representation for that datatype.

According to the non-limiting example of FIG. 1, the datatypes "double," "datetime," "categorical," "string," and "graphics object" can support the common property "missing," which can indicate missing values. A computing environment, such as the MATLAB computing environment, can be configured to treat missing values differently than other values. For example, in the MATLAB computing environment, arithmetic operations on missing values can return missing values (e.g., while 0+1=1, NaN+1=NaN). As an additional example, logical operations on missing values can return a logical object having the value "false" (e.g., while (0==0)=True, (NaN==NaN)=False). As shown in FIG. 1, and described below, the common property "missing" can be associated with different values having different representations for different datatypes. In this example, the datatype "uint8" may not support the common property "missing," as no native value may be associated with that common property.

The datatype "double" can represent the common property "missing" with the native value "Not-a-Number" ("NaN") in the MATLAB computing environment. As a non-limiting example, a double object may take the value "NaN" as the result of a mathematical operation with an undefined result (e.g., dividing zero by zero), or when meaningful values are unavailable (e.g., when a sensor cannot produce measurements at a specified data acquisition rate). One of skill in the art would recognize other circumstances in which a double object may take the value "NaN," and the above examples are not intended to be limiting. In some aspects, the datatype double can represent the native value "NaN" according to the IEEE Standard for Floating-Point Arithmetic. For example, the datatype double can represent the native value "NaN" as three binary numbers: a sign bit taking any value, an exponent with the value $e_{max}+1$, and a non-zero significand.

The datatype "datetime" can represent the common property "missing" with the native value "Not-a-Time" ("NaT") in the MATLAB computing environment. As a non-limiting example, the value "NaT" may arise when converting objects of other datatypes into datetimes. For example, a conversion operation that receives a string storing an improperly formatted date (e.g., the string may store "02-15-2017" when the conversion operation expects dates formatted as "yyyy-mm-dd") may return "NaT." Similarly, a conversion operation that receives a string storing an impossible date (e.g., "Feb. 31, 2017") may return "NaT." One of skill in the art would recognize other circumstances in which a datetime object may take the value "NaT," and the above examples are not intended to be limiting. In some aspects, the native value "NaT" can be represented using a double having the value "NaN." Therefore, the datatype "datetime" can represent the native value "NaT" with a sign bit taking any value, an exponent with the value $e_{max}+1$, and a non-zero significand.

The datatype "categorical" can represent the common property "missing" with the native value "undefined" in the MATLAB computing environment. As a non-limiting example, the value "undefined" may arise when attempting to assign a value to a categorical array that lacks a corresponding category for the value (e.g., attempting to create a categorical array including values 1, 2, 3, and 4, but only specifying three corresponding categories). One of skill in the art would recognize other circumstances in which a categorical object may take the value "undefined," and the above example is not intended to be limiting. In some aspects, the datatype "categorical" can represent the native value "undefined" using an integer having the value "0."

The datatype "string" can represent the common property "missing" with the native value "<missing>" in the MATLAB computing environment. As a non-limiting example, the value "<missing>" may arise when expanding a string array using subscribed assignment. For example, when a string array includes three elements, assigning another element as the fifth element in the array automatically causes the MATLAB computing environment to create a string with the value "<missing>" as the fourth element in the string array. One of skill in the art would recognize other circumstances in which a string object may take the value "<missing>," and the above example is not intended to be limiting. In some aspects, the datatype "string" can represent the native value "<missing>" using a null pointer (e.g., a pointer having a special value indicating that it does not point to any data).

The datatype "graphical" can represent the common property "missing" with the native value "<missing>" in the MATLAB computing environment. In some aspects, the value "<missing>" can arise as the result of performing an operation. For example, an operation can be configured to return all graphics handles meeting a specified criterion. When no graphics handles meet the criterion, the operation can be configured to return "<missing>." As an additional example, an operation can create an array of graphical objects and initialize these objects with the native value "<missing>". One of skill in the art would recognize other circumstances in which a graphical object may take the value "<missing>," and the above example is not intended to be limiting. In some aspects, the datatype "graphical" can represent the native value "<missing>" using a default placeholder.

According to the non-limiting example of FIG. 1, the datatypes "uint8," "double," and "categorical," can support the common property "Maximum," which can indicate the maximum possible value of the datatype. As shown in FIG. 1, and described below, the common property "maximum" can be associated with different values having different representations for different datatypes. In some instances, the value may depend on the object, (e.g., the value of maximum for an object of the categorical datatype can depend on the number of categories defined for that object, as described below). In this example, the datatypes "datetime," "string," and "graphics object" may not support the common property "maximum," as these datatypes may lack a native value associated with that common property.

The datatype "uint8" can represent the common property "maximum" with the native value "255" in the MATLAB computing environment. As would be appreciated by one of skill in the art, the value 255 is the maximum value that can be represented using an unsigned 8-bit binary number. In some aspects, the datatype "uint8" can represent the native value "255" as the binary number "11111111".

The datatype "double" can represent the common property "maximum" with the native value "+Inf" in the MATLAB computing environment. As non-limiting examples, a double object may take the value "+Inf" as the result of a mathematical operation (e.g., dividing a positive nonzero number by zero) or as the result of an operation that creates an array of double objects taking the value "+Inf." One of skill in the art would recognize other circumstances in which a double object may take the value "+Inf," and the above example is not intended to be limiting. In some aspects, the datatype double can represent the native value "+Inf" according to the IEEE Standard for Floating-Point Arithmetic. For example, the datatype double can represent the native value "+Inf" as three binary numbers: a sign bit of zero, an exponent with the value $e_{max}+1$, and a significand of zero.

The datatype "categorical" can represent the common property "maximum" with a user-defined native value in the MATLAB computing environment. In this non-limiting example, the representation of a categorical object in the MATLAB computing environment can include a set of user-defined categories associated with the counting numbers one to the number of categories. For example, the instruction B=categorical({"label1" "label2" "label3"},'Ordinal', true) can create an categorical array B with three user-defined categories represented by the integers 1="label1", 2="label2", and 3="label3". In this non-limiting example, the native value for maximum for this object can be "label3" which can be represented by the integer "3".

According to the non-limiting example of FIG. 1, the datatypes "uint8," "double," and "categorical," can support the common property "minimum," which can indicate the minimum possible value of the datatype. As shown in FIG. 1, and described below, the common property "minimum" can be associated with different values having different representations for different datatypes. In this example, the datatypes "datetime," "string," and "graphics object" may not support the common property "minimum," as these datatypes may lack a native value associated with that common property.

The datatype "uint8" can represent the common property "minimum" with the native value "0" in the MATLAB computing environment. As would be appreciated by one of skill in the art, the value 0 is the minimum value that can be represented using an unsigned 8-bit binary number. In some aspects, the datatype "uint8" can represent the native value "255" as the binary number "00000000".

The datatype "double" can represent the common property "minimum" with the native value "−Inf" in the MATLAB computing environment. As a non-limiting example, a double object may take the value "−Inf" as the result of a mathematical operation (e.g., dividing a negative nonzero number by zero), or as the result of an operation that creates an array of doubles with value "−Inf." One of skill in the art would recognize other circumstances in which a double object may take the value "−Inf," and the above example is not intended to be limiting. In some aspects, the datatype double can represent the native value "−Inf" according to the IEEE Standard for Floating-Point Arithmetic. For example, the datatype double can represent the native value "−Inf" as three binary numbers: a sign bit of one, an exponent with the value $e_{max}+1$, and a significand of zero.

The datatype "categorical" can represent the common property "minimum" with a user-defined native value in the MATLAB computing environment. In this non-limiting example, the representation of a categorical object in the MATLAB computing environment can include a set of user-defined categories associated with the counting numbers one to the number of categories. For example, the instruction B=categorical({"label1" "label2" "label3"},'Ordinal', true) can create an categorical array B with three user-defined categories represented by the integers 1="label1", 2="label2", and 3="label3". In this non-limiting example, the native value for maximum for this object can be "label1" which can be represented by the integer "1".

As would be appreciated by one of ordinary skill in the art, other common properties can be expressed in a particular computing environment. As described above, a particular computing environment can express a "default value" common property associated with default values for datatypes. For example, a particular computing environment can include multiple datatypes each having a native value that is a default value for that datatype. In some aspects, these native values can be assigned during initialization of the datatype, can be defined as default values, or can otherwise be associated with the common property of "default value." Similarly, a particular computing environment can express an "error" common property associated with an error indication for a datatype. For example, a datatype encapsulating measurements received from a sensor can include a native value indicating that an error has occurred at the sensor. As an additional example, a block in a graphical modeling system (e.g., the SIMULINK graphical programming environment), can include a native value indicating that assumptions governing the block have been violated.

As would also be appreciated by one of ordinary skill in the art, user-defined datatypes can support common properties. For example, a user can create a datatype that supports the common property "missing." In some aspects, a user-defined datatype supporting a common property can have a native value associated with that common property. For example, a user-defined datatype supporting the common property "missing" can have a native value associated with the common property "missing." In some aspects, a native value of a user-defined datatype associated with a common property can differ from the native values of other datatypes associated with the common property. For example, a user-defined datatype may be configured to store integer measurement values between "0" and "1000," and to use the value "−99" to indicate missing measurements. In this example, the native value of "−99" is associated with the common property "missing" for the user-defined datatype. This native value differs from the native value "NaN," which can be associated with the common property "missing" for the datatype "double." Furthermore, in this example, the representation of the integer "−99," a binary number, differs from the representation of the native value "NaN," a set of three binary numbers.

As depicted in FIG. 2, multiple common properties can be associated with a single native value. FIG. 2 shows two exemplary common properties associated with overlapping sets of native values in the MatLab computing environment. As shown in FIG. 2 and discussed above with regard to FIG. 1, in the MatLab computing environment the common property "missing" (Missing 201) can be associated with the native value "NaN" for the datatype "double" (NaN 205), the native value "NaT" for the datatype "datetime" (NaT 207), and/or the native value "placeholder" for the datatype "graphical" (placeholder 209). In the MatLab computing environment the common property "default" (default 203) can be associated with the native value "empty string" for the datatype "string" (empty 211) and placeholder 209. In this example, empty 211 can be represented by a pointer to an array of characters containing zero characters. Thus, in this example, missing 201 and default 203 can both encompass placeholder object 209. But missing 201 may not encompass empty 211, while default 203 may not encompass NaN 205 and NaT 207. As would be appreciated by one of skill in the art, additional common properties can encompass one or more of NaN 205, NaT 207, placeholder object 209, and empty 211.

Consistent with disclosed embodiments, datatypes can represent common properties in a computing environment, such as the common properties discussed above with regards to FIG. 1 and FIG. 2. Users can use datatypes representing common properties in programs rather than explicitly specifying the native values associated with the common properties. For example, a program can include the instructions:

A=M;
B=M;

According to the systems and methods described herein, the computing environment can include a datatype "MISSING" that represents the common property "missing." When M is a MISSING object, A is a double object, and B is a datetime object, these instructions can cause the computing environment to assign the native value "NaN" to the double object A and the native value "NaT" to the datetime object B. The user that created the program, in this example, need not even know the native values representing the common property "missing" for the datatypes "double" and "datetime," because the computing environment automatically handles assignment of the correct native value.

Similarly, the computing environment can include a datatype "MAXIMUM" that represents the common property "maximum." When M is a MAXIMUM object, A is a double object, and B is a uint8 object, these instructions can cause the computing environment to assign the native value "+inf" to the double object A and the native value "255" to the datetime object B. Again, the user that created the program need not even know the native values representing the common property "maximum" for the datatypes "double" and "uint8," because the computing environment automatically handles assignment of the correct native value.

In some embodiments, objects of common property datatypes can be "valueless." In some implementations, a valueless object can be an object that does not contain a value. For example, the computing system may not be configured to allocate memory for storing a value to a valueless object. In various implementations, a valueless object can be an object that contains one or more values lacking semantic meaning in the computing environment (e.g., the processing of a valueless object by the computing environment may not depend upon the one or more values contained by the valueless object). In various implementations, a valueless object can be a first object convertible by computing environment into a second object of another datatype, the value(s) of second object independent of value(s) of the first object (e.g., the one or more values of the first object can determine whether or how the computing environment processes the first object, but not the one or more value(s) of the second object). In some implementations, a valueless common property datatype can be a common property datatype having valueless objects. For example, the datatype "MISSING" can be a valueless datatype when the datatype "MISSING" specifies that MISSING objects are valueless objects.

In various embodiments, objects of common property datatypes can take values. In some implementation, objects of a common property datatype can contain values corresponding to at least some of the datatypes supporting the common property. For example, objects of the common property datatype "DEFAULT" can contain the value "empty string" corresponding to the datatype "string." In various implementations, when converting a common property object to an object of another datatype, a computing environment can use the value corresponding to the other datatype to determine the value of the object of the other datatype. For example, when converting a DEFAULT object to a string object, the computing environment can use the value "empty string" corresponding to the datatype "string" as the value for the string object. In various implementations, the values contained in the common property objects can be created, read, or written by the computing environment, increasing the flexibility and extensibility of the common property datatype. For example, the computing environment can be configured to replace the value "empty string" with a string of whitespace characters in a first common property object. The computing environment can then use this string of whitespace characters as the value for a string object when converting this first common property object to the string object.

Common property datatypes can specify operations for converting common property objects into native values associated with the common properties, consistent with disclosed embodiments. For example, the datatype "MISSING" can specify a method for converting MISSING objects into double objects having the value "NaN." Likewise, the datatype "MAXIMUM" can specify a method for converting MAXIMUM objects into uint8 objects having the value 255.

A computing environment can be configured to use a precedence hierarchy when performing operations on objects, as described herein. For example, the computing environment can be configured to use a precedence hierarchy when performing concatenation or assignment operations. As an additional example, the computing environment can be configured to use a precedence hierarchy when resolving overloaded operators. In some implementations a precedence hierarchy can include data and/or instructions stored on a non-transitory computer readable medium. In some implementations, a precedence hierarchy can be built into the computing environment. In various implementations, the computing environment can establish a precedence hierarchy according to a file, such as a configuration file or program. In some implementations, the computing environment can interact with a user to establish a precedence hierarchy.

A precedence hierarchy can include multiple categories of datatypes. In some implementations, a dominant datatype can belong to a higher category in the precedence hierarchy than a subordinate datatype. As would be understood by one of skill in the art, dominant and subordinate are relative terms. A first datatype can be dominant with respect for a second datatype and subordinate with respect to a third datatype.

A computing environment can be configured with one or more precedence hierarchies to reduce the burden of ensuring compatibility between datatypes. In some implementations, a dominant datatype can specify operations capable of processing subordinate datatypes. For example, the dominant datatype can specify methods for converting subordinate datatypes to the dominate datatype. As an additional example, the dominant datatype can specify constructors for generating new objects of the dominant datatype based on objects of subordinate datatypes. Because these methods and constructors can rely upon implementation details of the subordinate datatypes, modifications to subordinate datatypes can necessitate modifications to the dominate datatype. In some implementations, a subordinate datatype may not specify operations capable of processing dominant datatypes. Therefore modifications to dominant datatypes may not necessitate modifications to the subordinate datatype. By making more fundamental, less-frequently changed datatypes lower precedence than less fundamental, more-frequently changed datatypes, the burden of ensuring compatibility between datatypes can be reduced.

Figure 3A:
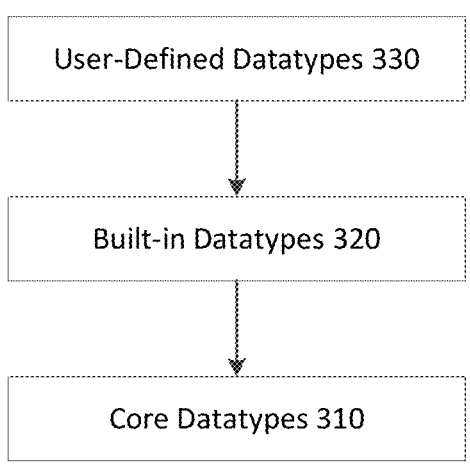
FIGS. 3A and 3B depict two exemplary precedence hierarchies.

FIG. 3A depicts an exemplary precedence hierarchy 301 consistent with disclosed embodiments. Precedence hierarchy 301 includes three categories (core datatypes 310, built-in datatypes 320, and user-defined datatypes 330), though envisioned precedence hierarchies can include more or fewer categories.

According to exemplary precedence hierarchy 301, core datatypes 310 can be subordinate to built-in datatypes 320 and user-defined datatypes 330, consistent with disclosed embodiments. Core datatypes 310 can include datatypes that are part of the computing environment. While users may be able to create objects of datatypes in Core datatypes 310, and call operations specified by datatypes in core datatypes 310, the computing environment may not allow users to delete or modify datatypes in core datatypes 310. In some aspects, the programs defining core datatypes 310 may be provided as object code or machine code. Non-limiting examples of core datatypes 310 in the MatLab computing environment include "uint8," "double," "char," "string," and "logical." As would be understood by one of skill in the art, these fundamental datatypes may be infrequently altered in ways requiring modifications to datatypes higher on precedence hierarchy 301.

According to exemplary precedence hierarchy 301, built-in datatypes 320 can be subordinate to user-defined datatypes 330 and dominant over core datatypes 310, consistent with disclosed embodiments. Built-in datatypes 320 can include datatypes provided by the computing environment that are defined with reference to core datatypes 310, and/or other built-in datatypes. For example, a user-defined datatype can have public or private variables that are objects of datatypes in core datatypes 310 and/or built-in datatypes 320. Non-limiting examples of built-in datatypes 320 in the MatLab computing environment include "datetime" (e.g., a datetime object can include a double object and metadata governing interpretation of the value of this double object) and "complex" (e.g., an instance of complex can include objects of numeric datatypes such as "double" that store the real part and the imaginary part of the complex number). In some aspects, built-in datatypes can be provided in toolboxes or other extensions of the computing environment. In various aspects, the programs defining at least some of built-in datatypes 320 can be human-readable source code. The computing environment can allow users to review, modify, and/or delete such built-in datatypes 320. In some aspects, the programs defining at least some of built-in datatypes 320 can be provided as object code or machine code, preventing users from reviewing or modifying these datatypes. Built-in datatypes 320 can encompass a greater number of datatypes than core datatypes 310. Built-in datatypes 320 can be subject to revision more often that core datatypes 310. As described above, datatypes in built-in datatypes 320 can specify operations capable of processing core datatypes 310.

According to exemplary precedence hierarchy 301, user-defined datatypes 330 can be dominant over built-in datatypes 320 and core datatypes 310, consistent with disclosed embodiments. User-defined datatypes 330 can include datatypes defined by a user with reference to core datatypes 310, built-in datatypes 320, and/or other user-defined datatypes. For example, a user-defined datatype can have public or private variables that are objects of core datatypes, built-in datatypes, and/or other user-defined datatypes. User-defined datatypes 330 may potentially encompass a far greater number of datatypes than core datatypes 310 and built-in datatypes 320. These datatypes may change far more often than core datatypes 310 and built-in datatypes 320, as users write and revise programs. Users may also have greater control over user-defined datatypes 330 than core datatypes 310 and built-in datatypes 320. This exemplary implementation of precedence hierarchy 301 therefore allocates onto the users the responsibility for specify operations capable of processing core datatypes 310 and built-in datatypes 320.

Figure 3B:
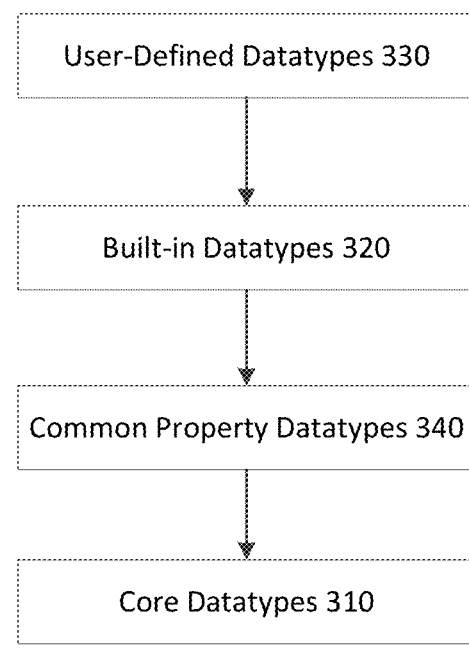

FIG. 3B depicts an exemplary precedence hierarchy 303 consistent with disclosed embodiments. Similar to precedence hierarchy 301, precedence hierarchy 303 can include core datatypes 310, built-in datatypes 320, and user-defined datatypes 330. But this precedence hierarchy can also include common property datatypes 340, consistent with disclosed embodiments. Common property datatypes 340 can include common property datatypes such as "MISSING" and "MAXIMUM" described above.

As shown in precedence hierarchy 303, Common property datatypes 340 can be dominant over core datatypes 310 and subordinate to built-in datatypes 320 and user-defined datatypes 330. Thus common property datatypes 340 can specify operations for processing core datatypes 310, while built-in datatypes 320 and user-defined datatypes 330 can specify operations for processing common property datatypes 340. As would be appreciated by one of skill in the art, precedence hierarchy 303 is not intended to be limiting. In some implementations, common property datatypes 340 can be subordinate to core datatypes 310. In various implementations, common property datatypes 340 can be dominant over one or more of built-in datatypes 320 and user-defined datatypes 330.

In some implementations, an operation can encompasse a function, method, constructor, operator, procedure, instruction, or routine. Operations can be built-in to a computing environment, can be provided in toolboxes, and/or can be user-defined. A datatype can specify an operation as part of a type definition of the datatype. In various instances, the specified operation can return objects of that datatype. In some instances, an operation specified by a datatype can take objects of that datatype, or of another datatype. For example, a string datatype can specify a concatenation operation for use with string objects. This concatenation operation can return a string object. In some instances, this concatenation operation can take one or more string objects. As an additional example, a string datatype can specify a concatenation operation for use with non-string objects. For example, the string datatype can specify a concatenation operation that can take a double object and another object (e.g., a string object) and return a string object.

In some implementations, a program can be a collection of operations executable or interpretable within a computing environment. A program can be human-readable code (e.g., source code). A program can be the result of compiling or interpreting human-readable code (e.g., object code or machine code). A program can be executed interactively (e.g., line-by-line using a command-line interface) or non-interactively (e.g., executing a script or m-file). A program can be stored in a non-transitory computer-readable storage medium.

In some implementations, implicit conversion can be automatic conversion of one datatype into another by a compiler or interpreter, as would be understood by one of ordinary skill in the art. A computing environment can be configured to support implicit conversion. In some embodiments, a computing environment can be configured to perform implicit conversion when concatenating objects and/or when performing assignments. In some implementations, when performing implicit conversion, a computing environment can be configured to convert common property objects into objects of other datatypes. The objects of the other datatypes can have the appropriate native values for the other datatypes and the common property. For example, a computing environment can be configured to automatically convert a "MISSING" object into a double object having the native value "NaN" when performing concatenation or assignments. The computing environment can be configured to perform implicit conversion according to the methods described below with regard to FIGS. 4A and 4B.

In some implementations, a computing environment can be configured to provide a concatenation operation. This concatenation operation can combine objects into homogenous arrays (e.g., arrays containing objects of a single datatype). For example, when A is a double object and B is a MISSING object, the concatenation operation can be:

C=[A, B]

Here, A and B are arguments of the concatenation operation and C is a resulting homogenous array.

Figure 4A:
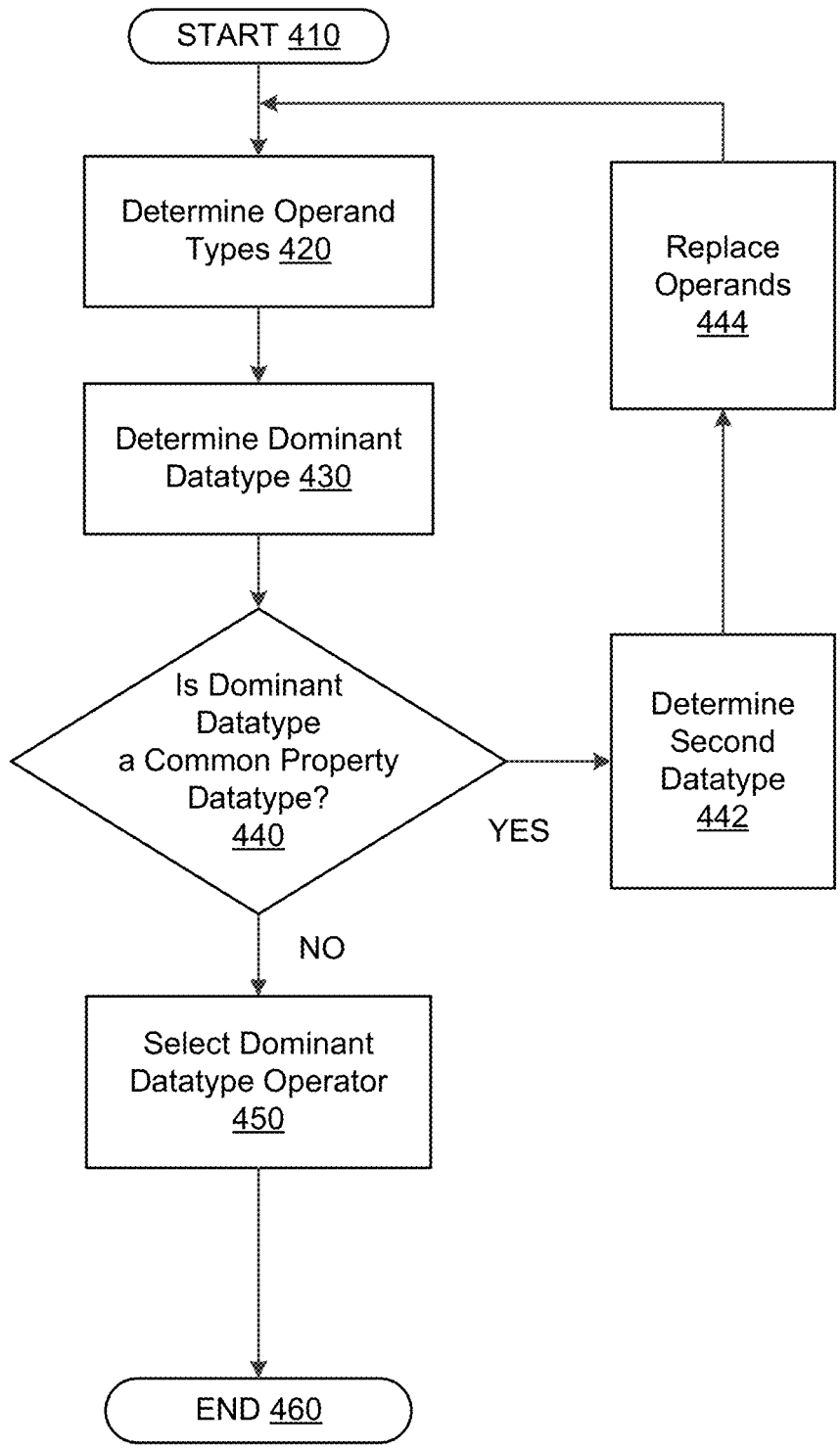
FIG. 4A depicts a flowchart for concatenating objects.

FIG. 4A depicts a flowchart of exemplary method 401 for concatenating common property objects with objects of other datatypes into homogenous arrays, consistent with disclosed embodiments.

Method 401 can begin at Step 410. After Step 410, the computing environment can determine the datatypes of the concatenation operation at Step 420, according to methods known to one of skill in the art. To continue the above example, the computing environment can determine that A is a double object and B is a MISSING object.

After Step 420, the computing environment can determine a dominant datatype at Step 430. As described above, the computing environment can be configured with a precedence hierarchy, such as precedence hierarchy 303. The highest precedence argument of the concatenation operation can be the dominant datatype. To continue the example, according to precedence hierarchy 303, "double" is a core datatype and subordinate to "MISSING." Therefore, in this example, the dominant datatype is "MISSING."

After Step 430, the computing environment can determine at Step 440 whether the dominant datatype is a common property datatype. When the dominant datatype is a common property datatype, the computing environment can be configured to convert the common property datatype argument(s) in the concatenation operation into a second datatype.

At Step 442 the computing environment can determine the second datatype. The computing environment can be configured to determine as the second datatype the next most dominant datatype among the arguments. In this example, the next most dominant datatype among the arguments is "double." In some aspects, the computing environment can be configured to determine the next most dominant datatype among the arguments that is not a common property datatype. For example, if the arguments comprised a double object, a MISSING object, and a MAXIMUM object, the computing environment can be configured to determine the "double" datatype as the second datatype.

After the second datatype is determined in Step 442, the computing environment can convert the common property argument(s) in Step 444. The computing environment can be configured to convert the common property argument(s) to object(s) of the second datatype. The computing environment can be configured to convert the common property argument(s) using a method specified by the common property datatype. The object(s) of the second datatype can have the native value associated with the common property for the second datatype. To continue the example, the computing environment can use a conversion method specified by the datatype "MISSING" to convert the MISSING object to a double object having the value "NaN."

After converting the common property argument(s) to the second datatype in Step 444, the computing environment can return to step 420. In some implementations, the computing environment can be configured to repeat Steps 420-444 to iteratively replace argument(s) representing common propert(ies). For example, if the arguments comprised a double object, a MISSING object, and a MAXIMUM object, the computing environment can convert the MISSING object to "NaN" in a first iteration and convert the MAXIMUM object to "+Inf" in a second iteration. In various implementations, the computing environment can be configured to replace argument(s) representing common propert(ies) in a single pass. For example, if the arguments comprised a double object, a MISSING object, and a MAXIMUM object, the computing environment can convert the MISSING object to "NaN" and the MAXIMUM object to "+Inf" in a single iteration.

When the dominant datatype is not a common property datatype, the computing environment can convert the argument(s) of the subordinate datatype(s) into the dominant datatype. As described above, the dominant datatype can provide operations for converting objects of subordinate datatypes into objects of the dominant datatype. For example, suppose that A is a datetime object and B is a MISSING object. In this example, the "datetime" datatype can include constructors that can take MISSING objects and create datetime objects initialized the value "NaT." The computing environment can then concatenate the converted argument(s) and the remaining argument(s) in Step 450, creating an array of the dominant datatype. The method can then finish at Step 480.

In some implementations, a computing environment can be configured to provide an assignment operation. This assignment operation can copy a right object into a left object (as would be appreciated by one of skill in the art, the syntax of assignment operations can differ between computing environments. The terms "right object" and "left object" are adopted for convenience and are not intended to be limiting). In some embodiments, the assignment statement may not be a subscripted assignment statement. For example:

A=M;

In this example, the computing environment overwrites the value of the left object A with the value of the right object M. In some instances the computing environment can be configured to convert the right object M into the datatype of left object A before performing the assignment, thereby preserving the datatype of A. In some embodiments this assignment statement is a subscripted assignment statement. For example:

A(3,4)=M;

In this example, the computing environment can copy the right object M into the third and fourth elements of the left object A. In some implementations, the computing environment can be configured to create A to enable this assignment. In various implementations, the computing environment can be configured to expand A as necessary to include four elements to enable this assignment.

Figure 4B:
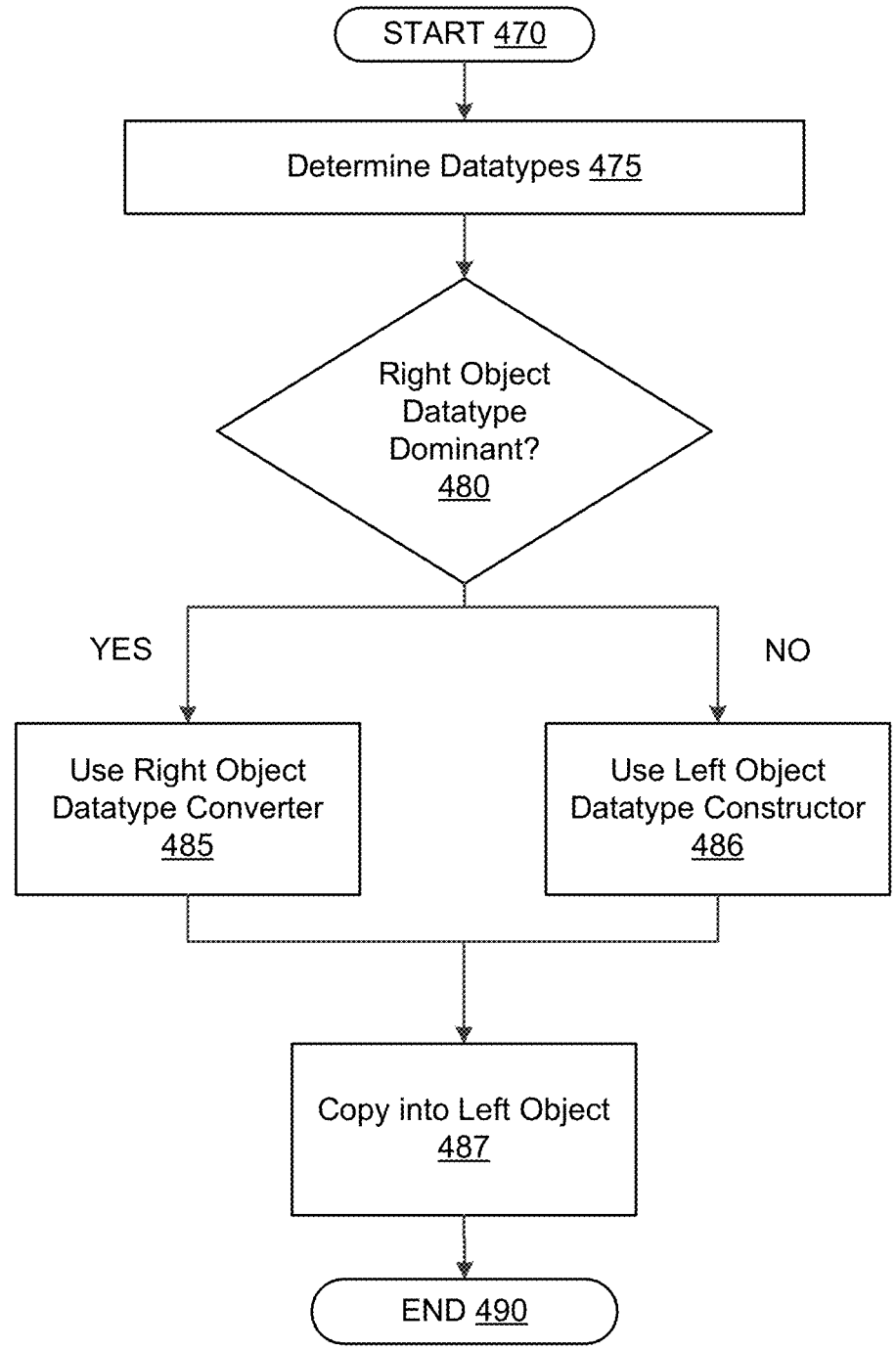
FIG. 4B depicts a flowchart for assigning objects.

FIG. 4B depicts a flowchart of exemplary method 403 for concatenating common property objects with objects of other datatypes into homogenous arrays, consistent with disclosed embodiments.

Method 403 can begin at Step 470. After Step 470, the computing environment can determine the datatypes of the left and right objects at Step 480, according to methods known to one of skill in the art. To continue the above example, the computing environment can determine that the left object A is a double object and the right object M is a MISSING object.

After Step 470, the computing environment can determine whether the left argument or the right argument is the dominant datatype at Step 480. As described above, the computing environment can be configured with a precedence hierarchy, such as precedence hierarchy 303. The higher precedence of the left object and the right object can be the dominant datatype. To continue the example, according to precedence hierarchy 303, "double" is a core datatype and subordinate to "MISSING." Therefore, in this example, the right object M is the dominant object.

After Step 480, if the right object datatype is dominant, the computing environment can convert the right object into an instance of the left object datatype in Step 485. In some aspects, the computing environment can be configured to call a conversion method specified by the right object datatype. For example:

A(3,4)=MISSING.double(M);

In this example, the common property datatype MISSING can specify a method MISSING.double( ) that converts from MISSING objects to double objects. The computing environment can call this method. This method call can take MISSING object M as an input and return a double object. This double object can have the native value associated with "missing" for the datatype double. For example, this double object can have the native value "NaN."

After Step 480, if the left object datatype is dominant, the computing environment can create an instance of the left object datatype in Step 486. In some aspects, the computing environment can be configured to call a constructor specified by the left object datatype. For example, suppose left object A is a datetime object. According to precedence hierarchy 303, "datetime" is a built-in datatype and dominant over "MISSING." The "datetime" datatype can be configured to specify operations enabling compatibility with subordinate datatypes. For example:

A(3,4)=Datetime(M);

In this example, the datatype Datetime can specify a constructor that takes a MISSING object and creates a datetime object having the value "NaT."

After either of Step 485 or Step 486, the computing environment can copy the value of the right object into the left object. For example, when A is a double object, the computing environment can copy the value of the double object returned by MISSING.double(M) into A(3,4). For example, when A is a datetime object, the computing environment can copy the value of the datetime object constructed by datetime(M) into A(3,4). The method can then finish at Step 490.

As described above with regard to FIGS. 1, 2, 3A, 3B, 4A and 4B, an exemplary computing environment using datatypes that represent common properties can be configured to address exemplary implementation considerations concerning the computing environment, datatypes, common properties, common property datatypes, precedence hierarchies, operations, and implicit conversion. A system implementing such an exemplary computing environment is described below.

Figure 5:
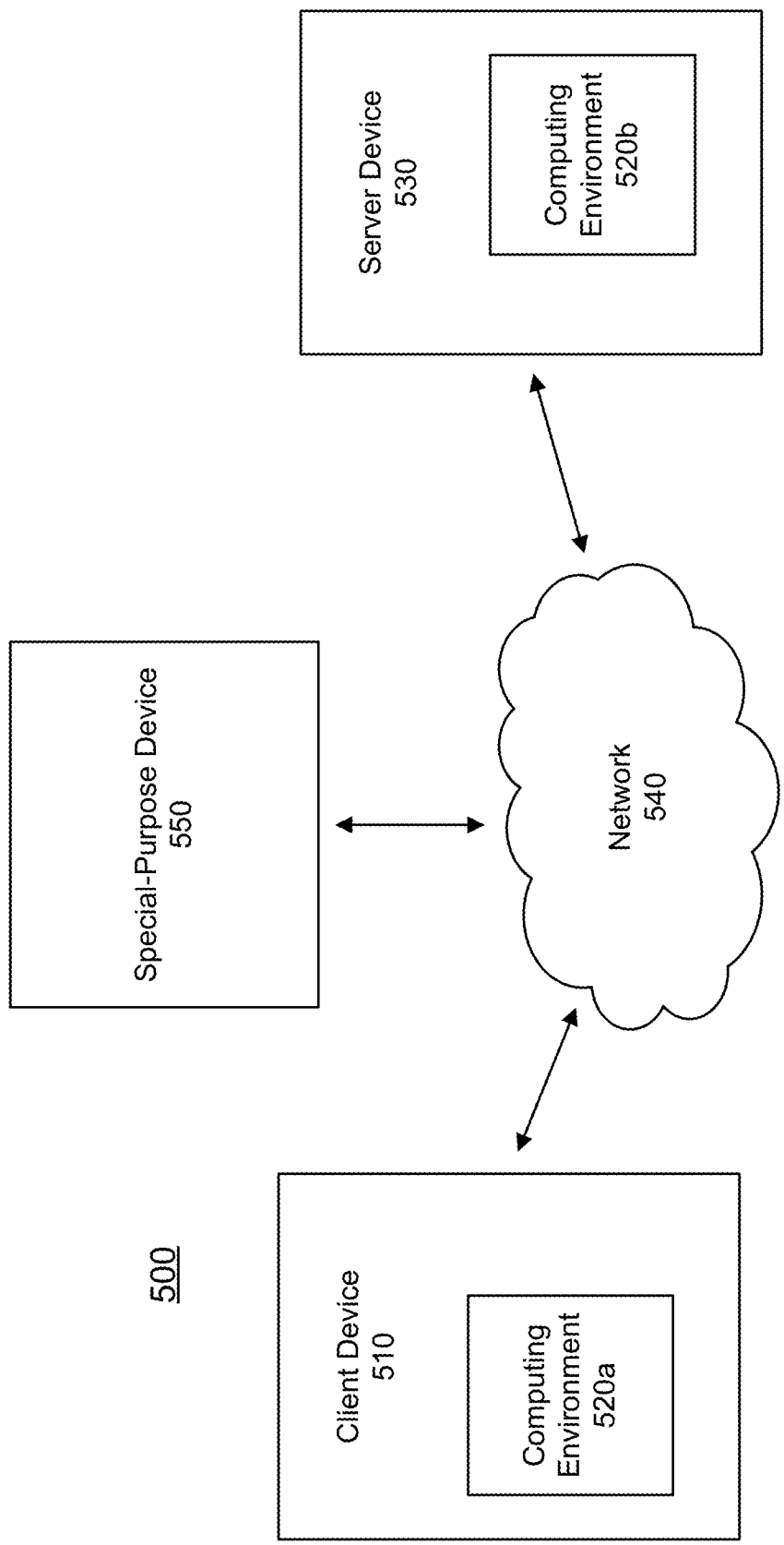
FIG. 5 depicts a schematic of an exemplary computing environment for implementing a common property datatype.

FIG. 5 depicts a schematic of an exemplary system 500 for implementing a computing environment, consistent with disclosed embodiments. This computing environment can be configured to support datatypes representing common properties, as described above. As shown in FIG. 5, system 500 can include client device 510, server device 530, network 540, and special purpose device 550. Components of system 500 can be configured to communicate using network 540. Components of system 500 can be configured to implement the disclosed embodiments in at least one of software and hardware. For example, embodiments can be implemented at least partially in hardware using special purpose device 550.

Client device 510 can include a device capable of receiving, generating, storing, processing, and/or providing information. For example, client device 510 can be a computing device (e.g., a desktop computer, a laptop computer, a tablet computer, a handheld computer, a server, etc.), a mobile phone (e.g., a smart phone, a radio telephone, etc.), or a similar device. Client device 510 can be configured to operate computing environment 520*a*. In some embodiments, client device 510 can be configured to access another computing environment. This computing environment can be operated by another device, such as server device 530.

Server device 530 can include one or more devices capable of receiving, generating, storing, processing, and/or providing information, such as information described herein. For example, server device 530 can include a computing device, such as a server, a desktop computer, a laptop computer, a tablet computer, a handheld computer, or a similar device. As an additional example, server device 530 can comprise one or more devices implementing a cloud computing platform, such as Amazon Web Services, Microsoft Azure, or Google Cloud. In some implementations, server device 530 can be configured to host a computing environment, such as computing environment 520*b*.

Network 540 can include any type of network (including infrastructure) that provides communications, exchanges information, and/or facilitates the exchange of information between the components of system 500, and/or between system 500 and other systems. For example, network 540 may include one or more wired and/or wireless networks. As an additional example, network 540 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks.

Special purpose device 550 may comprise hardware and/or software components configured to implement embodiments of the present disclosure. Special purpose device 550 may comprise one or more processors configured to interpret and/or execute instructions. The one or more processors may comprise one or more processor cores for parallel computing. Special purpose device 550 may comprise one or more memories that store information and/or instructions for use by the one or more processors.

As would be appreciated by one of skill in the art, the particular arrangement of devices and networks depicted in FIG. 5 is not intended to be limiting. In some embodiments, additional devices and/or networks may be added, and/or the depicted components of system 500 may be combined, divided, modified, or removed. For example, envisioned embodiments may implement a superset or a subset of the depicted components of system 500. As an additional example, the functionality described with regards to FIG. 5 may be distributed among one or more devices of system 100.

Figure 6:
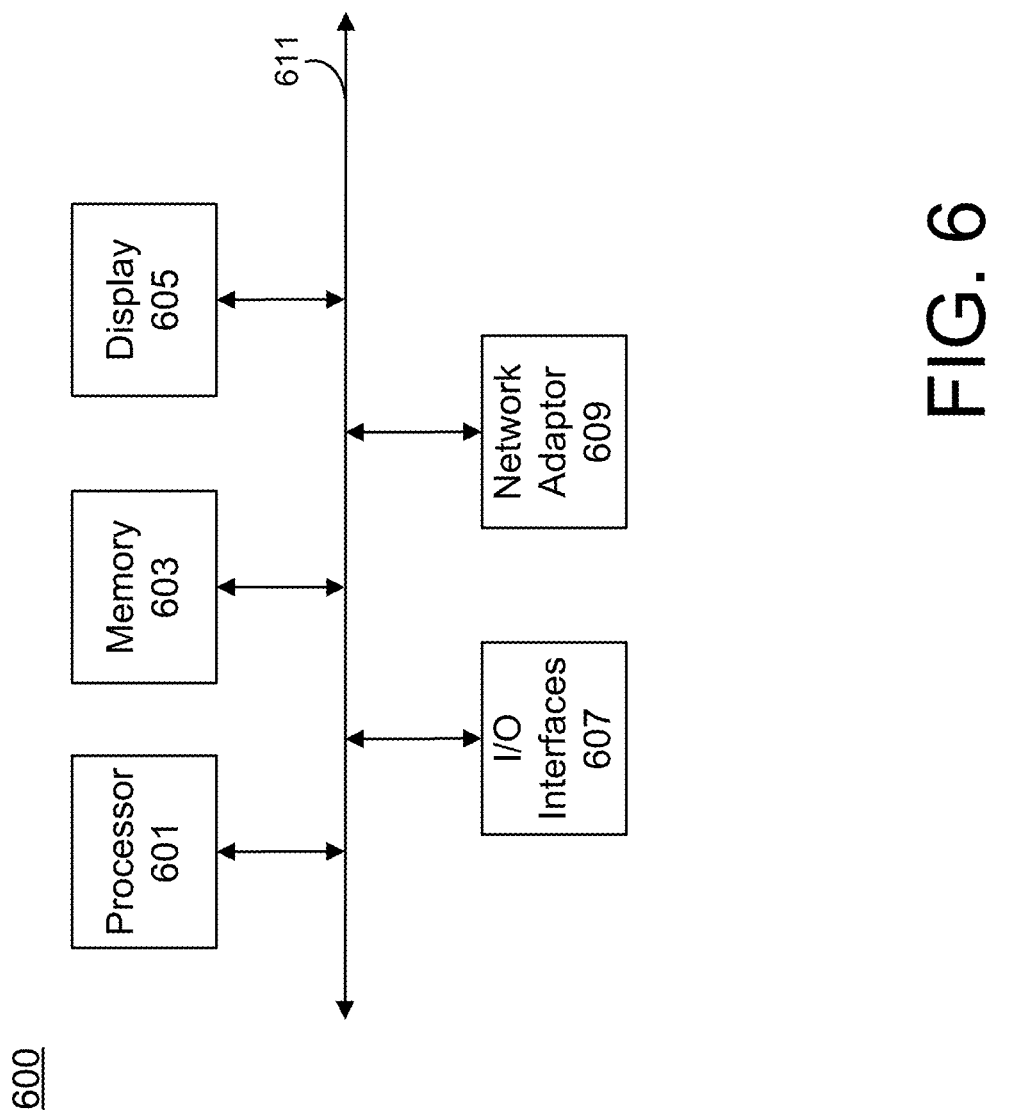
FIG. 6 depicts a schematic of an exemplary computing device for implementing the computing environment.

As described above with regards to FIG. 5, the disclosed techniques or systems are implemented via one or more computing devices consistent with disclosed embodiments. FIG. 6 depicts a block diagram of an exemplary computing device 600 suitable for implementing a computing environment. In some embodiments, computing device 600 includes a processor 601, memory 603, display 605, I/O interface(s) 607, and network adapter 609. These units may communicate with each other via bus 611, or wirelessly. The components shown in FIG. 6 may reside in a single device or multiple devices. Computing device 600 can be a stand-alone device, or can be part of a computing cluster, such as a cloud computing system. For example, computing device 600 can be part of a system providing software, infrastructure, or platforms as a service.

Consistent with disclosed embodiments, processor 601 may include one or more microprocessors or central processing units (CPU). The one or more microprocessors or CPUs may have one or more cores. Computing device 600 may include one or more processors 601 and may further operate with one or more other processors that are remote with respect to processors 601. Memory 603 may include non-transitory memory containing non-transitory instructions, such as a computer hard disk, random access memory (RAM), removable storage, or remote computer storage. In some aspects, memory 603 may be configured to store software programs. In some aspects, processor 601 may be configured to execute non-transitory instructions and/or programs stored on memory 603 to configure computing device 600 to perform operations of the disclosed systems and methods. In various aspects, as would be recognized by one of skill in the art, processor 601 may be configured to execute non-transitory instructions and/or programs stored on a remote memory to perform operations of the disclosed systems and methods.

Display 605 may be any device which provides a visual output, for example, a computer monitor, an LCD screen, etc. I/O interfaces 607 may include hardware and/or a combination of hardware and software for communicating information to computing device 600 from a user of computing device 600, such as a keyboard, mouse, trackball, audio input device, touch screen, infrared input interface, or similar device. Network adapter 609 may include hardware and/or a combination of hardware and software for enabling computing device 600 to exchange information with external networks. For example, network adapter 609 may include a wireless wide area network (WWAN) adapter, a Bluetooth module, a near field communication module, or a local area network (LAN) adapter.

Figure 7:
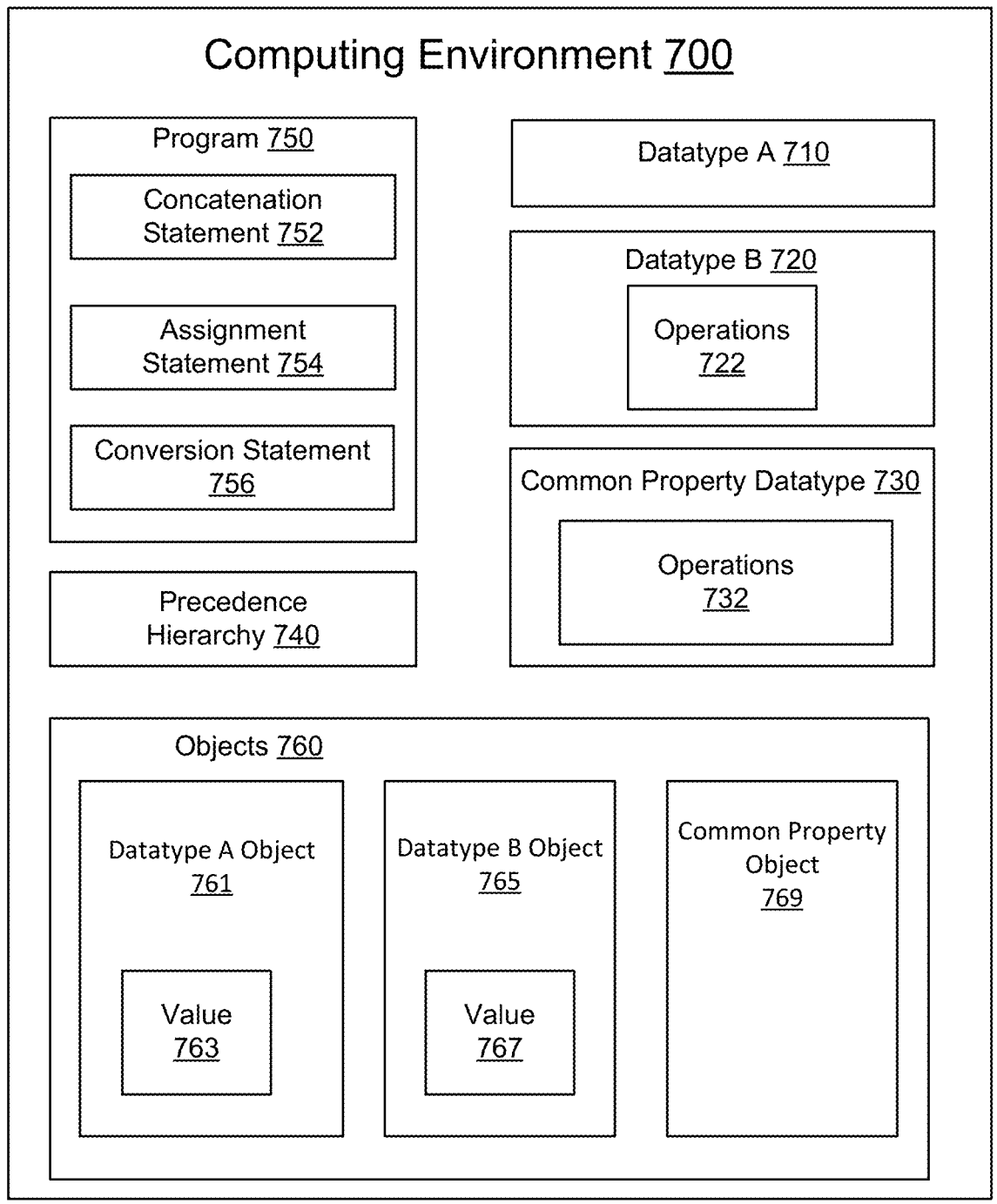
FIG. 7 illustrates logical components of an exemplary computing environment for implementing a common property datatype.
Figure 8A:
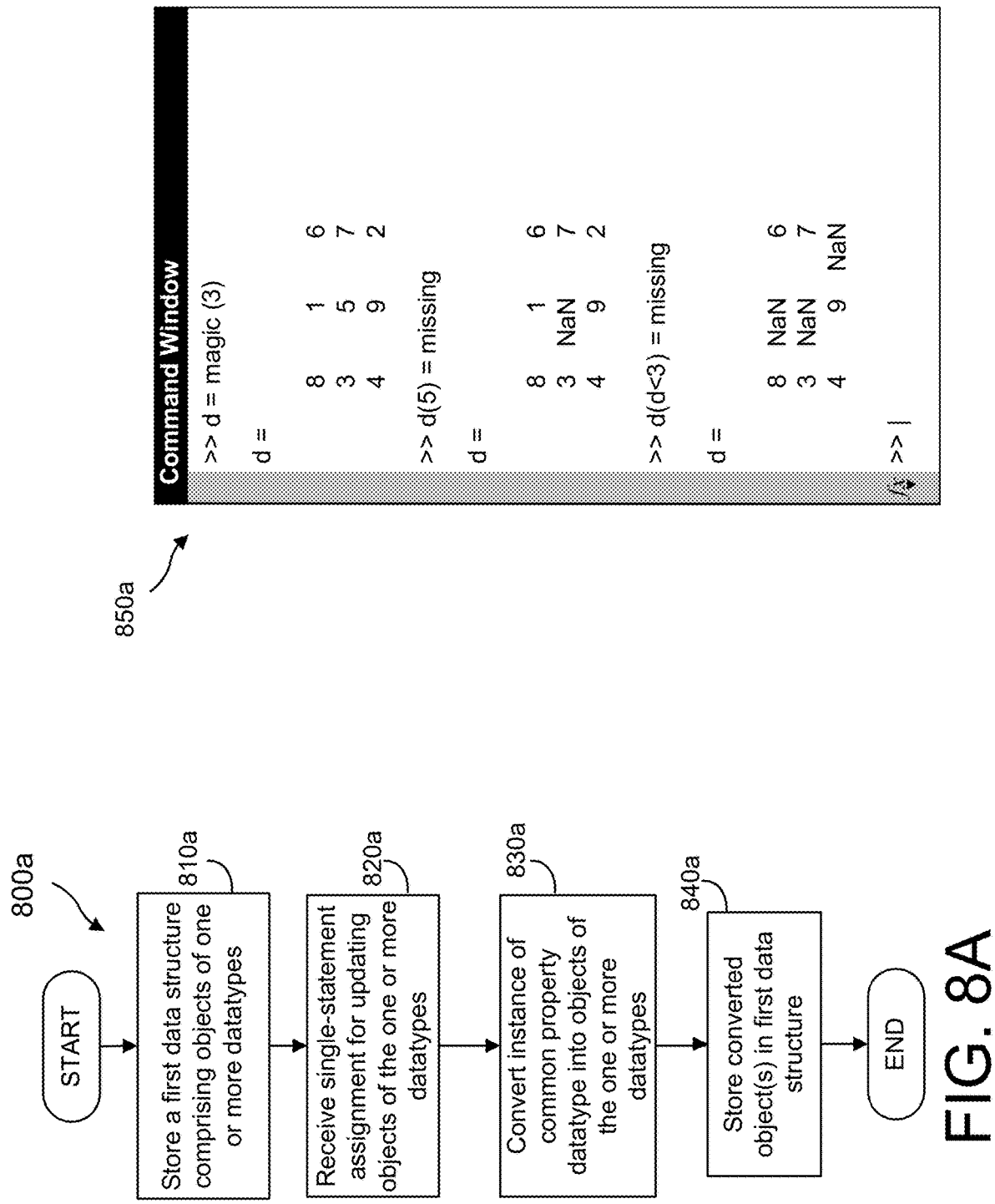
FIGS. 8A to 8D depict exemplary applications of a MINIMUM datatype.
Figure 8B:
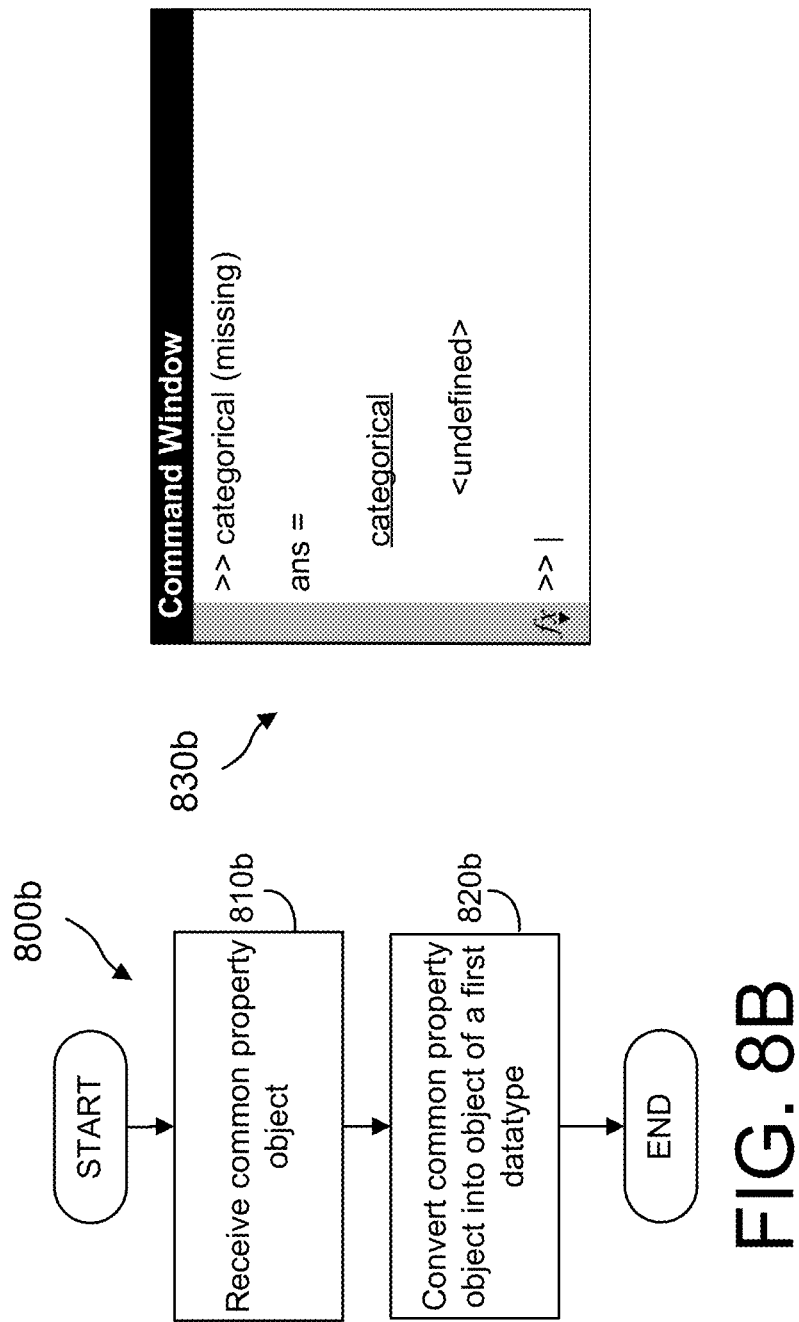
Figure 8C:
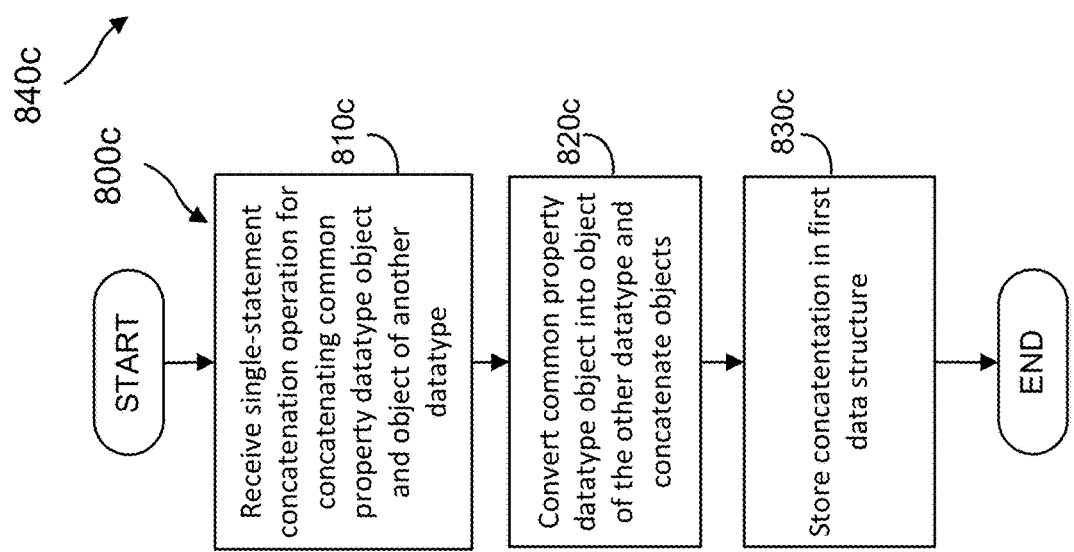
Figure 8D:
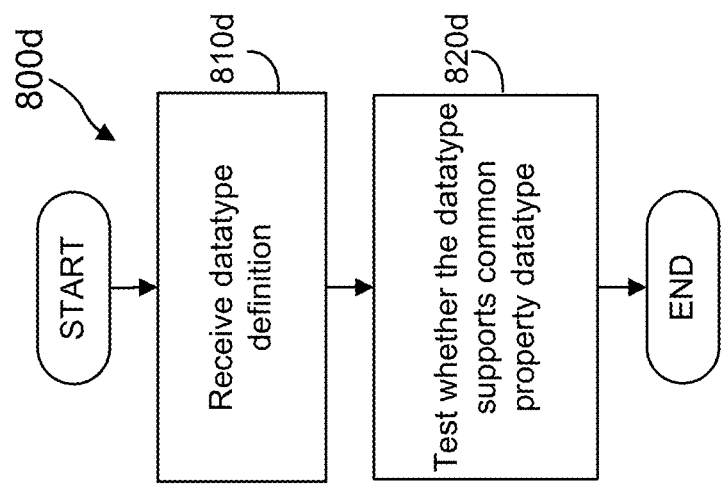

FIG. 7 illustrates logical components of an exemplary computing environment 700. These logical components include datatypes (e.g., datatype A 710, datatype B 720, common property datatype 730), precedence hierarchies (e.g., precedence hierarchy 740), programs (e.g., program 750), and objects 760. These components can comprise data and/or instructions stored in one or more non-transitory computer-readable media (e.g., one or more computer memories). Exemplary computing environment 700 can be implemented on client device 510, server 530, and/or special purpose device 550, consistent with disclosed embodiments. In various embodiments, exemplary computing environment 700 can be implemented using one or more computing devices, such as exemplary computing device 600.

As depicted in FIG. 7 and described above, computing environment 700 can be configured to support multiple datatypes (e.g., datatype A 710, datatype B 720, and common property datatype 730), consistent with disclosed embodiments. In this example, datatype A 710 can be subordinate to common property datatype 730 and datatype B 720, while common property datatype 730 can be subordinate to datatype B 720. For example, datatype A 710 can be a core datatype (e.g., uint8 or double), while datatype B 720 can be a built-in datatype (e.g., datetime) or a user-defined datatype. According to precedence hierarchy 740, datatypes can specify operations for use with subordinate datatypes.

As described above with regard to Section 2.2—Datatypes, datatype A 710 can specify that datatype A object 761 can take one or more values (e.g., value 763), and can also specify the ranges that these values may take. Datatype A can also specify operations that can be performed using datatype A (not shown in FIG. 7). Likewise, datatype B 720 can specify that datatype B object 765 can take one or more values (e.g., value 767), and can also specify the ranges that these values may take. Datatype B 720 can also specify operations 732 that can be performed using datatype B object 765. Furthermore, according to precedence hierarchy 740, datatypes can specify operations for using subordinate common property datatypes.

As a non-limiting example, datatype B 720 can therefore be implemented according to the following pseudocode, consistent with the disclosed embodiments:

```
class DatatypeB {
public value type value;
public DatatypeB (Missing m)
value=native_missing_value;
}
public concatenation(Missing m, DatatypeB b) {
   DatatypeB temp=new DatatypeB(m);
   DatatypeB temp2=new DatatypeB( );
   temp2=[temp b];
   return temp2;
}
public subscripted assignment (Missing m, DatatypeB b,
   int location) {
   DatatypeB temp=new DatatypeB(m);
   b(location)=temp;
   return b;
}
}
```

In this non-limiting example, datatype B 720 specifies operations and that datatype B object 765 takes a value. The operations include a constructor that takes a MISSING object and creates a datatype B object 765 having the native value representing the common property "missing" for datatype B 720. The operations further include concatenation and subscripted assignment methods for use with MISSING objects. These methods can call the constructor for creating datatype B objects 765 from MISSING objects. As would be appreciated by one of skill in the art, computing environment 700 can be configured to call these concatenation and subscripted assignment operations according to known methods of operator overloading when executing or interpreting program 750. One of skill in the art would recognize that the particular syntax of datatype B 720 can depend on computing environment 700. Furthermore, the definition of datatype B 720 can include additional or fewer values and operations. Therefore, the above example is not intended to be limiting.

As an additional example, as described above with regard to Section 2.4—Common Property Datatypes, common property datatype 730 can represent a common property in computing environment 700. Common property datatype 730 can specify that objects of common property datatype 730 are valueless objects (e.g., common property object 769) or that objects of common property datatype 730 take one or more values. Common property datatype 730 can also specify operations that can be performed on objects of common property datatype 730 (e.g., common property object 769), such as conversion methods for converting objects of common property datatype 730 into objects of other datatypes. As described above with regards to Section 2.4—Common Property Datatypes, the converted objects of the other datatypes can have the native values representing the common property for the other datatypes.

As a non-limiting example, common property datatype 730 can be the datatype "MISSING," can specify that MISSING objects are valueless objects, and common property object 769 can be a MISSING object. As a non-limiting example, such a "MISSING" datatype may be implemented according to the following pseudocode:

```
class Missing {
public datatypeA(Missing m) {
   DatatypeA  temp=new  DatatypeA(native_miss-
      ing_value);
   return temp.value;
}
}
```

In this non-limiting example, datatype "Missing" specifies operations and does not specify that a MISSING object takes a value. The operations include a method that converts a MISSING object to an object of Datatype A 710, which can call a constructor specified by Datatype A 710.

As depicted in FIG. 7 and described above, computing environment 700 can be configured to support precedence hierarchies (e.g., precedence hierarchy 740), consistent with disclosed embodiments. For example, as described above regard to 2.5—Precedence Hierarchies, precedence hierarchy 740 can govern performance of operations on objects 760 by computing environment 700. Precedence hierarchy 740 can, for example, comprise the hierarchy described with regard to FIG. 6B, including user-defined datatypes, built-in datatypes, common property datatypes, and core datatypes. As would be recognized by one of skill in the art, the relative placement of user-defined datatypes, built-in datatypes, common property datatypes, and core datatypes in the hierarchy can be varied without departing from the envisioned embodiments. Furthermore, additional levels in the hierarchy can be added, or existing levels combined, without departing from the envisioned embodiments.

As described above with regards to Section 2.7—Implicit Conversion, precedence hierarchy 740 can affect the performance of operations, consistent with disclosed embodiments. For example, in some embodiments, computing environment 700 can be configured to execute or interpret program 750 according to precedence hierarchy 740.

As a non-limiting example, program 750 can include concatenation statement 752, which can combine objects into homogenous arrays (e.g., arrays containing objects of a single datatype). As described above with regards to Section 2.7.1—Concatenation, concatenation statement 752 can be expressed in computing environment 700 as:

C=[A, M]

One of skill in the art would recognize that the particular syntax of concatenation statement 752 can depend on computing environment 700, and the above example is not intended to be limiting.

In a first aspect, A is datatype A object 761 and M is common property object 769 that represents a common property. Computing environment 700 can be configured to execute or interpret concatenation statement 752, which can take datatype A object 761 and common property object 769 as arguments and return the resulting homogenous array C of objects of datatype A 710. Datatype A 710 can be subordinate to common property datatype 730 according to precedence hierarchy 740. When executing or interpreting concatenation statement 752, computing environment 700 can be configured to use a conversion method specified by common property datatype 730 (e.g., one of operations 732) to convert common property object 769 to another object of datatype A 710. This converted object of datatype A 710 can have a native value that represents the common property for datatype A 710. Computing environment 700 can then concatenate datatype A object 761 with the converted object of datatype A 710 to generate homogenous array C.

In a second aspect, A is datatype B object 765 and M is common property object 769 that represents a common property. Computing environment 700 can be configured to execute or interpret concatenation statement 752, which can take datatype B object 765 and common property object 769 as arguments and return the resulting homogenous array C of objects of datatype B 720. Datatype B 720 can be dominant over common property datatype 730 according to precedence hierarchy 740. When executing or interpreting concatenation statement 752, computing environment 700 can be configured to create another object of datatype B 720 using a constructor specified by datatype B 720 (e.g., one of operations 722) that takes common property object 769 as an argument. This constructed object of datatype B 720 can have a native value that represents the common property for datatype B 720. Computing environment 700 can then concatenate datatype B object 765 with the constructed object of datatype B 720 to generate homogenous array C.

As an additional non-limiting example, program 750 can include subscripted assignment statement 754, which can copy one object into another object. As described above with regards to Section 2.7.2—Subscripted Assignment, subscripted assignment statement 754 can be expressed in computing environment 700 as:

A(3,4)=M;

In this example, the computing environment can copy the right object M into the third and fourth elements of the left object A. One of skill in the art would recognize that the particular syntax of subscripted assignment statement 754 can depend on computing environment 700, and the above example is not intended to be limiting.

In a first aspect, A is an array of objects of datatype A 710 and M is common property object 769 that represents a common property. Computing environment 700 can be configured to execute or interpret subscripted assignment statement 754, which can copy common property object 769 into the array of objects of datatype A 710. Datatype A 710 can be subordinate to common property datatype 730 according to precedence hierarchy 740. When executing or interpreting subscripted assignment statement 754, computing environment 700 can be configured to use a conversion method specified by common property datatype 730 (e.g., one of operations 732) to convert common property object 769 into another object of datatype A 710. This converted object of datatype A 710 can have a native value that represents the common property for datatype A 710. Computing environment 700 can then copy this converted object of datatype A 710 into the indexed elements of the array of objects of datatype A 710.

In a second aspect, A is an array of objects of datatype B 720 and M is common property object 769 that represents a common property. Computing environment 700 can be configured to execute or interpret subscripted assignment statement 754, which can copy common property object 769 into the array of objects of datatype B 720. Datatype B 720 can be dominant over common property datatype 730 according to precedence hierarchy 740. When executing or interpreting subscripted assignment statement 754, computing environment 700 can be configured to create another object of datatype B 720 using a constructor specified by datatype B 720 (e.g., one of operations 722) that takes common property object 769 as an argument. This constructed object of datatype B 720 can have a native value that represents the common property for datatype B 720. Computing environment 700 can then copy this constructed object of datatype B 720 into the indexed elements of the array of objects of datatype B 720.

As an additional non-limiting example, program 750 can include conversion statement 756, which can convert one object into another object. Similar to the process described above with regards to Section 2.7.2—Sub scripted Assignment, conversion statement 756 can be expressed in computing environment 700 as:

datatype X(M)

In this example, the computing environment can convert M into datatype X. One of skill in the art would recognize that the particular syntax of conversion statement 756 can depend on computing environment 700, and the above example is not intended to be limiting.

In a first aspect, datatype X is datatype A 710 and M is common property object 769 that represents a common property. Computing environment 700 can be configured to execute or interpret conversion statement 756, which can convert common property object 769 into an object of datatype A 710. Datatype A 710 can be subordinate to common property datatype 730 according to precedence hierarchy 740. When executing or interpreting conversion statement 756, computing environment 700 can be configured to use a conversion method specified by common property datatype 730 (e.g., one of operations 732) to convert common property object 769 into the object of datatype A 710. This converted object of datatype A 710 can have a native value that represents the common property for datatype A 710. Conversion statement 756 can return this converted object of datatype A 710.

In a second aspect, datatype X is datatype B 710 and M is common property object 769 that represents a common property. Computing environment 700 can be configured to execute or interpret conversion statement 756, which can convert common property object 769 into an object of datatype B 720. Datatype B 720 can be dominant over common property datatype 730 according to precedence hierarchy 740. When executing or interpreting conversion statement 756, computing environment 700 can be configured to create another object of datatype B 720 using a constructor specified by datatype B 720 (e.g., one of operations 722) that takes common property object 769 as an argument. This constructed object of datatype B 720 can have a native value that represents the common property for datatype B 720. Conversion statement 756 can return this constructed object of datatype B 720.

In some embodiments, computing environment 700 can be configured to recognize the use of a keyword in place of an common property datatype object (e.g., Common Property Object 769). In some implementations, computing environment 700 can treat such keywords reserved words in, as would be understood by one of skill in the art. As a non-limiting example, computing environment 700 can be configured to recognize the text "missing" in place of a MISSING object. For example, program 750 can alternatively include the following concatenation statement: C=[A, missing];

Similarly, program 750 can alternatively include the following subscripted assignment statement:

A(3,4)=missing;

Likewise, program 750 can alternatively include the following conversion statement:

datatype X(missing)

As shown above, these concatenation, subscripted assignment, and conversion statements use the keyword "missing" in place of a MISSING object. When executing or interpreting one of these statements, computing environment 700 can be configured to create a MISSING object using a constructor specified by common property datatype 730. Computing environment 700 can then continue executing the concatenation, subscripted assignment, or conversion statement by calling conversion methods or constructors as described above.

As would be appreciated by one of skill in the art, the depiction of exemplary computing environment 700 in FIG. 7 is not intended to be limiting. Consistent with disclosed embodiments, exemplary computing environment 700 can include additional components or fewer components. For example, exemplary computing environment 700 can include additional datatypes, programs, objects, precedence hierarchies, or can lack at least one of precedence hierarchy 740, datatype A 710, and datatype B 720.

FIGS. 8A-8D depict flowcharts illustrating four usage examples consistent with disclosed embodiments. The operations executed or interpreted by the computing environment in these usage examples can be part of a program (e.g., progam 750), command line input, results of a remote procedure call, or obtained by the computing environment in similar contexts known to one of skill in the art. As would be appreciated by one of skill in the art, disclosed embodiments can be used in a variety of operations and the depicted usage examples are not intended to be limiting.

In a first usage example, a single-statement assignment may be used for updating a data structure, consistent with disclosed embodiments. In exemplary Method 800a, illustrated in FIG. 8A, a first data structure comprising instances of one or more datatypes may be stored at Step 810a. At Step 820a, a single-statement assignment may be received. This assignment may be an instruction to update one or more instances of one or more datatypes in the one or more data structures. The instruction may refer to a common property datatype object. At Step 830a, the common property datatype object may be converted into one or more objects of the one or more other datatypes in the data structure. At Step 840a, the converted instance may be stored in the one or more data structures.

Exemplary screenshot 850a illustrates an exemplary implementation of Method 800a in the MATLAB language. This Exemplary screenshot 850a depicts subscripted assignment of a MISSING object to integer objects stored in an array "d." However, the disclosed embodiments can be used with other data structures. For example, the computing environment can perform the depicted subscripted assignment when the first data structure stores objects of multiple different datatypes. For example, when a first location of the first data structure contains a datetime object and a second location of the first data structure contains an integer object, the updated first data structure would have "NaT" in the first location and "NaN" in the second location.

In a second usage example, a single-statement conversion operation may be used to convert a common property datatype object into an object of another datatype, consistent with disclosed embodiments. In exemplary Method 800b, illustrated in FIG. 8B, the computing environment can receive a common property datatype object at step 810b. The computing environment can convert the common property datatype object to an object of another datatype at Step 820b. This conversion may be performed with, for example, a single-statement conversion operation. Such conversion may be either implicit or explicit. Exemplary screenshot 830b illustrates an exemplary implementation of Method 800b using explicit conversion in the MATLAB language.

In a third usage example, a single-statement concatenation operation may be used to concatenate or combine a common property datatype object with objects of other datatypes, consistent with disclosed embodiments. In exemplary Method 800c, illustrated in FIG. 8C, the computing environment can receive a single-statement concatenation operation for concatenating objects of one or more datatypes at Step 810c. At Step 820c, the computing environment can concatenate the one or more common property datatype objects with the objects of another datatype. This concatenation can involve the computing environment transforming the common property datatype objects (by conversion or construction as discussed above) into objects of the other datatype. The computing environment can store the resulting concatenation in a data structure at Step 530c. Exemplary screenshot 540c illustrates an exemplary implementation of Method 500c in the MATLAB language.

In a fourth usage example, a datatype may be tested to determine whether its definition properly supports a common property datatype, consistent with disclosed embodiments. In exemplary Method 800d, illustrated in FIG. 8D, a computing environment can receive a datatype definition at Step 810d. At Step 820d, the computing environment can test may be performed to determine whether the datatype definition properly supports a particular common property datatype. In some aspects, the computing environment can test whether assignment, concatenation, and/or conversion using this particular common property datatype is correctly supported by the received datatype. For example, the computing environment can test whether the assignment, concatenation, and/or casting using the datatype correctly results in an object of the datatype having the native value representing the common property for that datatype. In some embodiments, the computing environment can be configured to test compatibility of the received datatype definition with multiple common property datatypes and provide an indication of which, if any, common property datatypes the received datatype supports.

Figure 9A:

FIGS. 9A-9D illustrating three additional usage examples consistent with disclosed embodiments. FIG. 9A depicts a Table 910 used in these additional usage examples. Table 610 includes multiple rows. These rows can be referred to by their index value, appearing in the left-most cell of each row. Table 910 can comprise multiple columns, with data in each column being of a single datatype. The columns may be referred to by their index value, appearing at the top of each column. A particular cell may be referred to by the row index number and the column index number. For example, "cell 2A" may refer to the cell in row 2 and column A. In certain embodiments, the data in table 610 can be that shown in cells 2A through 2F, 3A through 3F, 4A through 4F, 5A through 5F, 6A through 6F, 7A through 7F; and 8A through 8F. In this case, the cells containing an index number, letter, or label and cells containing datatype labels may be omitted.

In some embodiments, table 910 can be generated according to the following pseudocode:

doubleVar=[NaN;3;5;7;9;11;13];
datetimeVar=[datetime(2014-05-26T13:30-05:00);
NaT; datetime(2014-08-26T13:30-04:00);
datetime(2014-09-26T13:30Z);
datetime(2017-02-08;2010-01-08);datetime(1900-01-01)];
stringVar=string({'one'; 'three'; ''; 'seven'; 'nine'; 'eleven'; 'thirteen'});
categoricalVar=categorical({'red; 'yellow'; 'blue'; ''; 'violet'; 'ultraviolet'; 'orange'});
charVar=['A'; 'C'; 'E'; 'G'; ' '; 'K'; 'M'];
graphicsVar=[plot(4,5); plot(1:3,1:3); bar(x,y); . . . bar([223; 256]); scatter(x,y); scatter(x,y,25); NaG];
T=Table(doubleVar, datetimeVar, stringVar, categoricalVar, charVar, graphicsVar);

As described above, in certain embodiments, table 910 may contain objects of different datatypes. In some embodiments, the objects in each column can be of a single datatype. For example, objects in column A may be double object, values in column B can be datetime object, values in column C may be string object, values in column D can be categorical objects, values in column E can be char objects, and values in column F can be graphics objects. Some objects in table 610 can have values that represent a common property. For example, cell 2A depicts a double object with the native value "NaN," which can represent the common property "missing" for the datatype double. As an additional example, cell 3B depicts a datetime object with the native value "NaT," which can represent the common property "missing" for the datatype datetime. As an additional example, cell 4C depicts a string object with the native value of the missing string (shown as two single quotes), which can represent the common property "missing" for the datatype string. Likewise, cell 5D depicts a categorical object with the native value "undefined" (shown as two single quotes), which can represent the common property "missing" for the datatype categorical. Similarly, cell 6E depicts a character object with the native value not-a-character (shown as a single quote, a space, and a single quote), which can represent the common property "missing" for the datatype character. Likewise, cell 8F depicts a graphics object with the native value "missing" (shown as "NaH"), which can represent the common property "missing" for the datatype graphics object.

In some embodiments, the computing environment can be configured to a common indicator in place of the native values representing a common property. For example, as illustrated in FIG. 9B, the computing environment can be configured to display the data structure of table 910 as shown in table 915. As shown in table 915, the computing environment can display the indicator "MISSING" in cells that contain a native value representing a common property "missing," such as NaN for the datatype double or NaT for the datatype datetime.

Figure 9C:
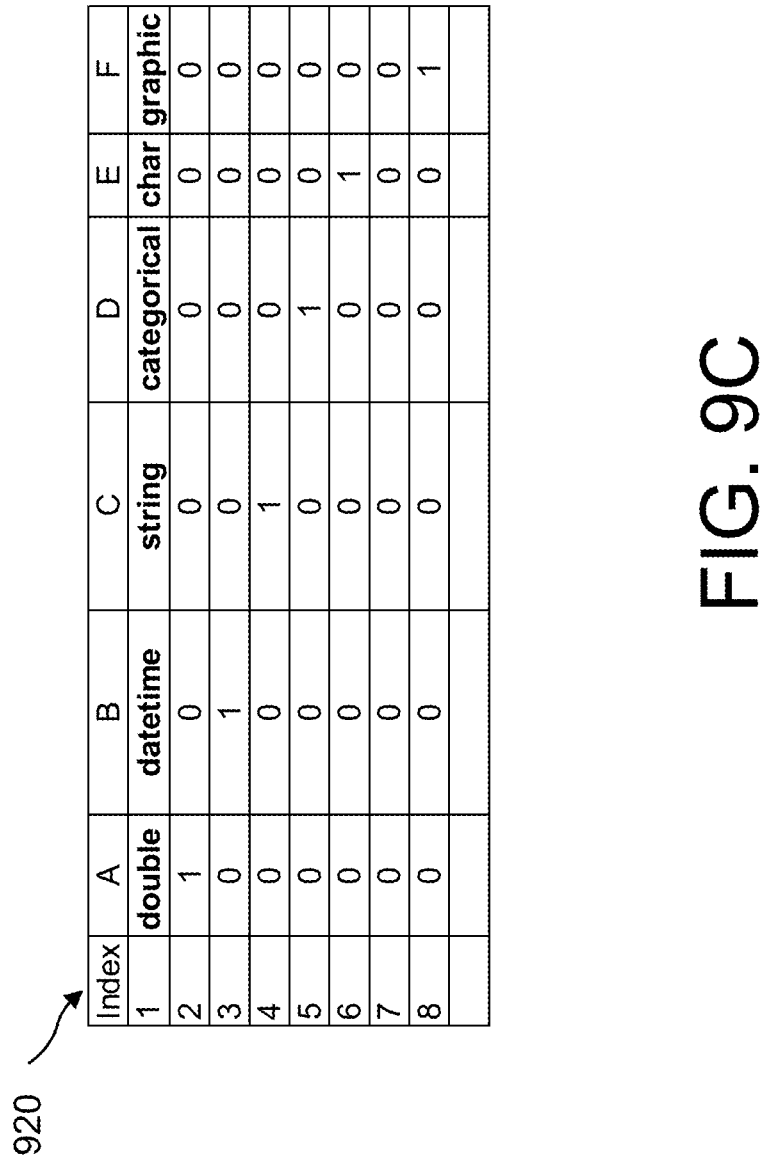
Figure 9D:

In some embodiments, the computing environment can be configured to generate the exemplary logical table 920 illustrated in FIG. 9C from table 910. Logical table 920 can indicate which cells in logical table 920 contain values representing a common property. For example, logical table 920 can indicate which cells in logical table 920 contain a native value representing the common property "missing." Logical table 920 may comprise a table of the same dimensions as table 910 and with a 0 in cells congruent to the cells of table 910 containing non-missing values and with a 1 in cells congruent to the cells of table 910 containing missing values. In such case, cells 2A, 3B, 4C, 5D, 6E, and 8F of logical table 920 can have a 1 because cells in those locations in table 910 had values representing the common property of a missing value. Logical table 920 may be generated according to the following pseudocode:

temp=ismissing(T);

In certain embodiments, the computing environment can be configured to generate the exemplary filtered table 930 illustrated in FIG. 9D from table 910. Filtered table 930 may be a table of the same dimensions as table 910. As discussed above, certain rows of table 910 may contain one or more native values representing a common property. The corresponding rows filtered table 930 may entirely contain native values representing the common property. The remaining row of filtered table 930 (row 7) matches the remaining row of table 910 (also row 7), which does not contain any native values representing the common property. In this manner, the rows of table 910 have been filtered, based on whether they contained a native value corresponding to the common property. Filtered table 930 may be generated by a single assignment statement according to the following pseudocode:

T(any(temp),:)=Missing;

The above pseudocode does not depend on any a-priori knowledge of the datatypes comprising table 910. In this manner, using common property datatypes can reduces the burden on users to learn the native values representing these common properties. Such common property datatypes can ease code reuse, extensibility, and maintenance of the technical computing environment, and of programs written for the technical computing environment.

As an additional usage example, computing environment can be configured to replace the ith and jth rows of an n-by-1 array of Datatype A 710 with native values representing the common property "missing" and the ith and jth rows of an n-by-1 array of Datatype B 710 with native values representing the common property "missing" using the keyword "Missing". This may be implemented according to the following pseudocode, yielding the following output:

```
ColumnA; //n-by-1 array of Datatype A with ith element missing
ColumnB; //n-by-1 array of Datatype B with jth element missing,
where j <> i
Names = {'Column A', 'Column B'};
T = Table(ColumnA, ColumnB, 'VariableNames', Names);
Mask = any(ismissing(T));
T(Mask,:) = Missing; //Missing as a Keyword
T([1 i j],:)
ans =
    Column A       Column B
    ─              ─
    A value        B value
    Missing        Missing
    Missing        Missing
```

In this manner, as described above, a user can interact with the computing environment to find and replace objects having native values that represent a common property without any a-priori knowledge of the datatypes comprising table T, or the native values representing the common properties for this particular datatype. This demonstrates a technical improvement realized through the use of common property datatypes.

FIG. 10 illustrates an exemplary table 1000 that may be generated using a keyword to assign common property objects to a data structure. For example, the keyword MAX can be used to assign a MAXIMUM object to a data structure. For example, the MAX keyword can be used to assign a double-type value of 1.7977e+308 to cell 2A (e.g., with coordinates (1,1)) because this may be the native value of the common property "maximum" for the double datatype. Similarly, the MAX keyword can be used to assign an int8-type value of 127 to cell 7D (e.g., with coordinate (6,4)) because this may be the native value of the common property "maximum" for the int8 datatype. Table 1000 may be generated using the following pseudocode:

T(1,1)=MAX;
T(2,2)=MAX;
T(5,3)=MAX;
T(6,4)=MAX;

The foregoing description of the inventions, along with their associated embodiments, has been presented for purposes of illustration only. It is not exhaustive and does not limit the inventions to the precise form disclosed. Those skilled in the art will appreciate from the foregoing description that modifications and variations are possible in light of the above teachings or can be acquired from practicing the inventions. For example, as described herein, the terms "row" and "column" are not intended to limit the disclosed embodiments to any particular table orientation or particular data structure, as would be recognized by one of skill in the art. As an additional example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and can also include other parts not describe in the embodiments. Accordingly, the inventions are not limited to the above-described embodiments, but instead are defined by the appended claims in light of their full scope of equivalents.

What is claimed is:

1. A system comprising:
   at least one processor; and
   at least one non-transitory computer-readable medium storing instructions that, when executed by the at least one processor, cause the system to perform a method comprising:
   receiving a conversion statement; an assignment statement and a data structure comprising a first object of a first datatype, the first datatype one of multiple datalayers; or a concatenation statement and the data structure;
   receiving a common property object of a common property datatype, the common property object representing a common property supported by the multiple datatypes, the common property including at least one of maximum, minimum, missing, error, or default, the multiple datatypes representing the common property using differing native values;
   executing or interpreting the received conversion statement, assignment statement, or concatenation statement, execution or interpretation comprising conversion of the common property object into a second object of the first datatype, the second object having a first native value representing the common property for the first datatype;
   when the conversion statement is received, storing the object;
   when the assignment statement is received, assigning the second object to a location of the first object in the data structure; and
   when the concatenation statement is received, generating a concatenated data structure by concatenating the data stucture and the second object and storing the concatenated data structure.

2. The system of claim 1, wherein the common property object is valueless.

3. The system of claim 1, wherein the second object is stored in a table.

4. The system of claim 1, wherein the conversion statement comprises a keyword associated with the common property.

5. The system of claim 1, wherein converting the common property object into the second object comprises calling a constructor specified by the first datatype.

6. The system of claim 1, wherein the differing native values include at least one of not-a-number or not-a-time.

7. A method comprising:
   receiving an assignment statement, a data structure comprising a first object of a first datatype, the first datatype one of multiple datatypes supporting a common property, the common property including at least one of maximum, minimum, missing, error, or default, the multiple datatypes representing the common property using differing native values; a conversion statement; or a concatenation statement and the data structure;
   receiving a common property object of a common property datatype, the common property object representing the common property supported by the multiple datatypes;
   executing or interpreting the received assignment statement, conversion statement, or concatenation statement, execution or interpretation comprising conversation of the common property object into a second object of the first datatype, the second object having a first native value representing the common property for the first datatype;
   when the conversion statement is received, storing the second object;
   when the assignment statement is received,
   assigning the second object to a location of the first object in the data structure; and
   when the concatenation statement is received, generating a concatenated data structure by concatenating the data structure and the second object and storing the concatenated data structure.

8. The method of claim 7, wherein:
   the data structure further comprises a third object of a second datatype differing from the first datatype, the second datatype one of the multiple datatypes supporting the common property;
   executing or interpreting the assignment statement further comprises converting the common property object into a fourth object of the second datatype, the fourth object having a second native value differing from the first native value, the second native value representing the common property for the second datatype; and the method further comprises assigning the fourth object to a location of the third object in the data structure.

9. The method of claim 7, wherein the assignment statement is a subscripted assignment statement.

10. The method of claim 7, wherein the assignment statement comprises a keyword associated with the common property.

11. The method of claim 7, wherein converting the common property object into the second object comprises calling a constructor specified by the first datatype.

12. The method of claim 7, wherein the differing native values include at least one of not-a-number or not-a-time.

13. A non-transitory computer-readable medium storing instructions that, when executed by at least one processor, cause a system to perform a method comprising:

receiving a concatenation statement, a data structure comprising a first object of a first datatype, the first datatype one of multiple datatypes supporting a common property, the common property including at least one of maximum, minimum, missing, error, or default, the multiple datatypes representing the common property using differing native values; a conversion statement; or an assignment and the data structure;

receiving a common property object of a common property datatype, the common property object representing the common property supported by the multiple datatypes;

executing or interpreting the received concatenation statement, conversion statement, or a assignment statement, execution or interpretation comprising conversion of the common property object into a second object of the first datatype, the second object having a first native value representing the common property for the first datatype;

when the conversion statement is received, storing the second object when the assignment statement is received, assigning the second object to a location of the first object in the data structure; and when the concatenation statement is received, generating a concatenated data structure by concatenating the data structure and the second object and storing the concatenated data structure.

14. The non-transitory computer-readable medium of claim 13, wherein the common property object is valueless.

15. The non-transitory computer-readable medium of claim 13, wherein the multiple datatypes represent the common property using distinct native values.

16. The non-transitory computer-readable medium of claim 13, wherein converting the common property object into the second object comprises calling a constructor specified by the first datatype.

17. The non-transitory computer-readable medium of claim 13, wherein the differing native values include at least one of not-a-number or not-a-time.

* * * * *